(12) United States Patent
Dawley et al.

(10) Patent No.: US 11,023,884 B2
(45) Date of Patent: Jun. 1, 2021

(54) ADDITIVE FOR SOLID ROCKET MOTOR HAVING PERCHLORATE OXIDIZER

(71) Applicant: Aerojet Rocketyne, Inc., Sacramento, CA (US)

(72) Inventors: Scott K. Dawley, Culpeper, VA (US); Daniel Doll, Orange, VA (US)

(73) Assignee: AEROJET ROCKETDYNE, INC., Orange, VA (US)

( * ) Notice: Subject to any disclaimer, the term of this patent is extended or adjusted under 35 U.S.C. 154(b) by 441 days.

(21) Appl. No.: 15/762,785

(22) PCT Filed: Nov. 15, 2016

(86) PCT No.: PCT/US2016/061966
§ 371 (c)(1),
(2) Date: Mar. 23, 2018

(87) PCT Pub. No.: WO2017/131840
PCT Pub. Date: Aug. 3, 2017

(65) Prior Publication Data
US 2019/0102773 A1    Apr. 4, 2019

Related U.S. Application Data

(60) Provisional application No. 62/257,071, filed on Nov. 18, 2015.

(51) Int. Cl.
| | | |
|---|---|---|
| C06B 29/00 | (2006.01) | |
| G06Q 20/34 | (2012.01) | |
| C06B 23/00 | (2006.01) | |
| C06D 5/06 | (2006.01) | |
| G06Q 20/38 | (2012.01) | |

(Continued)

(52) U.S. Cl.
CPC ......... G06Q 20/351 (2013.01); C06B 23/001 (2013.01); C06D 5/06 (2013.01);
(Continued)

(58) Field of Classification Search
USPC ........... 149/22, 37, 75, 76, 77, 108.2, 108.4, 149/109.4, 109.6
See application file for complete search history.

(56) References Cited

U.S. PATENT DOCUMENTS

| | | |
|---|---|---|
| 3,172,793 A | 3/1965 | Markowitz |
| 3,175,979 A | 3/1965 | Markowitz |

(Continued)

FOREIGN PATENT DOCUMENTS

WO    2005028842    3/2005

OTHER PUBLICATIONS

International Preliminary Report on Patentability for International Application No. PCT/US2016/061966 dated May 31, 2018.

(Continued)

*Primary Examiner* — James E McDonough

(57) ABSTRACT

A method for enhanced validation of an entity associated with a COF token includes: storing at least transaction data, a token requester identifier (TRJD), and a COF token identifier; receiving payment credentials, wherein the payment credentials include at least a COF-specific payment token; generating a transaction message, wherein the transaction message is formatted based on one or more standards and includes at least a plurality of data elements including at least a first data element configured to store the COF-specific payment token, a second data element configured to store the COF token identifier, a third data element configured to store the TRID, and one or more additional data elements configured to store the transaction data; and electronically transmitting the generated transaction message to a financial institution via a payment network.

11 Claims, 10 Drawing Sheets

(51) Int. Cl.
- *C06B 43/00* (2006.01)
- *C06B 33/00* (2006.01)
- *C06B 29/22* (2006.01)
- *C06B 29/02* (2006.01)
- *D03D 23/00* (2006.01)
- *D03D 43/00* (2006.01)
- *G06Q 20/12* (2012.01)

(52) U.S. Cl.
CPC ... G06Q 20/3829 (2013.01); G06Q 20/38215 (2013.01); *G06Q 20/12* (2013.01); *G06Q 2220/00* (2013.01)

(56) References Cited

U.S. PATENT DOCUMENTS

| | | | | |
|---|---|---|---|---|
| 3,809,585 | A | * | 5/1974 | Greenburg ......... C08G 18/6666 149/19.4 |
| 3,846,195 | A | * | 11/1974 | Zimmerman et al. ...................... C06B 45/10 149/19.4 |
| 4,023,995 | A | * | 5/1977 | Reed, Jr. ................ C06B 45/10 149/19.3 |
| 4,391,660 | A | | 7/1983 | Corley et al. |
| 8,025,010 | B1 | | 9/2011 | Lund |
| 2003/0041935 | A1 | | 3/2003 | Boyd et al. |
| 2004/0200553 | A1 | * | 10/2004 | Amtower, II ........... C06B 45/02 149/19.4 |
| 2010/0251694 | A1 | * | 10/2010 | Hugus .................... C06B 45/00 60/253 |

OTHER PUBLICATIONS

International Search Report and Written Opinion for PCT Application No. PCT/US2016/061966 completed Jul. 31, 2017.

\* cited by examiner

US 11,023,884 B2

ADDITIVE FOR SOLID ROCKET MOTOR HAVING PERCHLORATE OXIDIZER

CROSS-REFERENCE TO RELATED APPLICATIONS

This application claims priority to and the benefit of the filing date of U.S. application Ser. No. 14/957,444, filed Dec. 2, 2015, which is hereby incorporated by reference in its entirety.

FIELD

The present disclosure relates to the enhanced validation of a token requestor, specifically the use of a unique identification value conveyed via a specially formatted data message using a specified protocol and communication infrastructure to validate an entity providing a token as an authorized entity for usage of the token.

BACKGROUND

As more and more data exchanges and other transactions of information occur online, more and more entities configure their systems for the storage of sensitive user information and other data that is regularly used and transmitted, to provide for faster, more convenient usage by users, as well as in an effort to increase user security by not requiring the user to continuously resubmit the information. In many instances, having the entity store the sensitive data may be beneficial, as the entity's security and network may be greater than that of the user's. For instance, an entity might store payment card information, and be a Card-On-File (COF) entity. However, as entities begin to store more and more data for more and more users, they become a higher profile target of nefarious parties hoping to compromise the stored data. Such data may be highly valuable to a nefarious party, while the theft of such data may be exceedingly detrimental to the user, such as in instances where a social security number of credit card number are stolen.

Thus, there is a need for a technical solution where an entity can store sensitive user data for future transmission and use while rendering the data itself unusable in the hands of a non-authorized entity. By associating the sensitive data with the entity to which it is provided, future usage of that data can be prohibited unless being used by the entity or an authorized party, thus negating the detrimental effects of the compromise of the data. Particularly in the realm of electronic transactions and payment networks, the use of specialized payment tokens and entity-specific identifiers may enable a merchant, wallet provider, or other entity to store data suitable for use in a transaction that enables a user to transact without continuously resubmitting their information, while at the same time protecting the user from harm should the data be compromised.

SUMMARY

The present disclosure provides a description of systems and methods for enhanced validation of an entity associated with a Card-On-File (COF)-specific token.

A method for enhanced validation of an entity associated with a COF token includes: storing, in a memory of a processing server, at least transaction data, a token requester identifier (TRID), and a COF token identifier; receiving, by a receiving device of the processing server, payment credentials, wherein the payment credentials include at least a COF-specific payment token; generating, by a generation module of the processing server, a transaction message, wherein the transaction message is formatted based on one or more standards and includes at least a plurality of data elements including at least a first data element configured to store the COF-specific payment token, a second data element configured to store the COF token identifier, a third data element configured to store the token requester identifier (TRID), and one or more additional data elements configured to store the transaction data; and electronically transmitting, by a transmitting device of the processing server, the generated transaction message to a financial institution via a payment network.

Another method for enhanced validation of an entity associated with a COF token includes: storing, in a COF entity database of a processing server, a plurality of COF entity profiles, wherein each COF entity profile includes a structured data set related to an entity associated with a COF token including at least a COF token identifier and at least one token requester identifier (TRID) and/or COF-specific payment token; storing, in a token database of the processing server, a plurality of token profiles, wherein each token profile includes a structured data set related to a COF-specific payment token including at least the related COF-specific payment token and a transaction account number; receiving, by a receiving device of the processing server, a transaction message, wherein the transaction message is formatted based on one or more standards and includes a plurality of data elements including at least a first data element configured to store a specific payment token, a second data element configured to store a specific COF token identifier, a third data element configured to store a specific token requester identifier (TRID), and one or more additional data elements configured to store transaction data; executing, by a querying module of the processing server, a query on the COF entity database to identify a specific COF entity profile where the included COF token identifier corresponds to the specific COF token identifier stored in the second data element included in the received transaction message; executing, by the querying module of the processing server, a query on the token database to identify a specific token profile where the included payment token corresponds to the specific COF-specific payment token stored in the first data element included in the received transaction message; validating, by a validation module of the processing server, the entity related to the identified specific COF entity profile as genuine based on a correspondence between an included token requester identifier (TRID) and the specific token requester identifier (TRID) stored in the third data element included in the received transaction message or an included COF-specific payment token and the specific COF-specific payment token stored in the first data element included in the received transaction message; modifying, by a generation module of the processing server, the received transaction message by replacing the specific payment token stored in the first data element with the transaction account number stored in the identified specific token profile; and electronically transmitting, by a transmitting device of the processing server, the modified transaction message to a financial institution via a payment network.

A system for enhanced validation of an entity associated with a COF token includes: a memory of a processing server configured to store at least transaction data, a token requester identifier (TRID), and a COF token identifier; a receiving device of the processing server configured to receive payment credentials, wherein the payment credentials include at least a payment token; a generation module of the processing server configured to generate a transaction message, wherein the transaction message is formatted based on one or more standards and includes at least a plurality of data elements including at least a first data element configured to store the payment token, a second data element configured to store the COF token identifier, a third data element configured to store the token requester identifier (TRID), and one or more additional data elements configured to store the transaction data; and a transmitting device of the processing server configured to electronically transmit the generated transaction message to a financial institution via a payment network.

Another system for enhanced validation of an entity associated with a COF token includes: a COF entity database of a processing server configured to store a plurality of COF entity profiles, wherein each COF entity profile includes a structured data set related to an entity associated with a COF token including at least a COF token identifier and at least one token requester identifier (TRID) and/or payment token; a token database of the processing server configured store a plurality of token profiles, wherein each token profile includes a structured data set related to a payment token including at least the related payment token and a transaction account number; a receiving device of the processing server configured to receive a transaction message, wherein the transaction message is formatted based on one or more standards and includes a plurality of data elements including at least a first data element configured to store a specific payment token, a second data element configured to store a specific COF token identifier, a third data element configured to store a specific token requester identifier (TRID), and one or more additional data elements configured to store transaction data; a querying module of the processing server configured to execute a query on the COP entity database to identify a specific COF entity profile where the included COF token identifier corresponds to the specific COF token identifier stored in the second data element included in the received transaction message, and execute a query on the token database to identify a specific token profile where the included payment token corresponds to the specific payment token stored in the first data element included in the received transaction message; a validation module of the processing server configured to validate the entity related to the identified specific COF entity profile as genuine based on a correspondence between an included token requester identifier (TRID) and the specific token requester identifier (TRID) stored in the third data element included in the received transaction message or an included payment token and the specific payment token stored in the first data element included in the received transaction message; a generation module of the processing server configured to modify the received transaction message by replacing the specific payment token stored in the first data element with the transaction account number stored in the identified specific token profile; and a transmitting device of the processing server configured to electronically transmit the modified transaction message to a financial institution via a payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
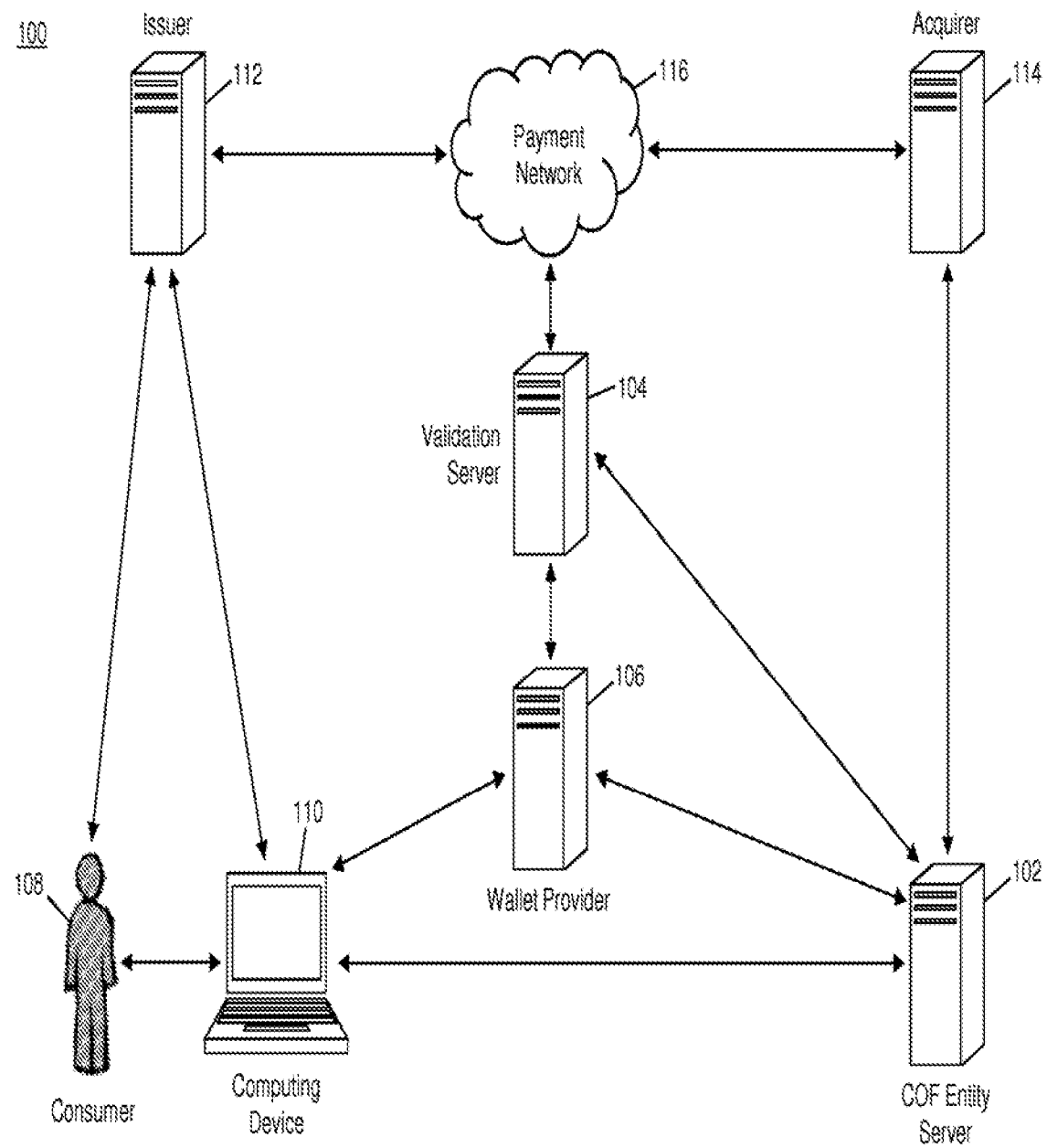
FIG. 1 is a block diagram illustrating a high level system architecture for the enhanced validation of a token requesting entity in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

COF entity—a COF entity may be a merchant, acquirer, payment service provide (PSP) and wallet, and any other computer system of that might otherwise hold payment card information for future transactions.

System for Enhanced Validation of Token Holding Entities

FIG. 1 illustrates a system 100 for the enhanced validation of a token holding entity and of transaction messages and other sensitive data originating therefrom.

The system 100 may include a COF entity server 102. The COP entity server 102, discussed in more detail below, may be configured to store sensitive data for use in electronic transactions. For example, the COF entity server 102 may be a specially configured computing system of a COF entity, which may be configured to store payment details associated with a transaction account for use in funding electronic transactions. The system 100 may also include a validation server 104. The validation server 104, discussed in more detail below, may be configured to validate the sensitive data originating from the COF entity server 102 as genuine. Using the methods and systems discussed herein, the COF entity server 102 may be configured to register with the validation server 104 for a COF-specific payment token, which may be issued to the COP entity server 102 or an entity associated therewith, referred to herein as a "token requesting entity" or "token requestor" in place of a primary account number and/or other payment details along with a COF entity-specific identifier for use in validation of the COF-specific payment token.

In some instances, the system 100 may include a wallet provider 106. The wallet provider 106 may be an entity configured to provide an electronic wallet, which would hold a token, for use by a consumer 108 via a computing device 110 for the storage of payment details associated with a transaction account for use in funding electronic transactions. The computing device 110 may be a desktop computer, laptop computer, notebook computer, tablet computer, cellular phone, smart phone, smart watch, smart television, wearable computing device, implantable computing device, or any other computing device suitable to store and use an electronic wallet. As discussed herein, the wallet provider 106 may be a token requesting entity such that a wallet would be a COF entity. In such instances, the wallet provider 106 may register for an entity-specific payment token from the validation server 104 and associated entity-specific identifier for use in place of payment details to be stored in the computing device 110 and conveyed to the validation server 104 for validation as part of an electronic transaction. Accordingly, the functions, configurations, and specifications of the merchant server 102 may be applicable to the wallet provider 106. For example, the registration and use of merchant-specific tokens and identifiers discussed herein may be applicable to a wallet provider 106 as a COF entity.

A consumer 108 may, using a computing device 110, provide payment details to a COF entity server 102 for storage and future use in electronic payment transactions. In some embodiments, the payment details may be stored specifically for use in electronic commerce ("e-commerce") transactions, such as may be conducted using the Internet, a cellular communication network, or other suitable communication method for the conducting of e-commerce transactions as will be apparent to persons having skill in the relevant art. The payment details may be associated with a transaction account issued to the consumer 108 by an issuer 112. The issuer 112 may be a financial institution, such as an issuing bank, or other entity configured to store, manage, issue, or otherwise be associated with transaction accounts suitable for use in funding e-commerce transactions.

Once the consumer 108 has supplied payment details for a transaction account to the COF entity server 102, the COF entity server 102 may register with the validation server 102 for a COF-specific payment token in place of the payment details. In some cases, the payment details may comprise the transaction account number of the transaction account. In other cases, the payment details may include additional data associated therewith for use in processing e-commerce transactions and/or authentication in the registration of the transaction account by the issuer 112. In some embodiments, the COF entity server 102 may electronically transmit the payment details to be replaced directly to the validation server 104. In other embodiments, the COF entity server 102 may electronically transmit authentication data associated with the transaction account to the validation server 104. In such an embodiment, the validation server 104 may be configured to retrieve the payment details from the corresponding issuer 112 by supplying the authentication data and any other necessary information, such as an indication of the transaction account for instances where the consumer 108 may have multiple transaction accounts with the issuer 112.

The validation server 104 may be configured to generate a COF-specific payment token. The COF-specific payment token may be a unique value suitable for use as a primary account number in e-commerce transactions. For example, the COF-specific payment token may be a 16-19 digit number, which may be formatted using standards associated with primary account numbers, such as by including a bank identification number associated with the validation server 104 for use in the routing of transaction messages thereto. The validation server 104 may also generate a specific TRID. The specific TRID may be a unique identification value associated with the COF entity server 102 or an entity associated therewith. In some embodiments, the validation server 104 may generate a COF token identifier, which may be a unique to the COF entity server 102 as well as the COF-specific payment token. In such instances, the COF entity server 102 may receive a different COF token identifier for each transaction account registered with the validation server 104.

When conducting an e-commerce transaction, the consumer 108 may select one or more products (e.g., goods or services) for purchase from a merchant associated with the COF entity server 102 (and therefore a COF entity), such as via a website accessed by or specially configured application program executed by the computing device 110. The consumer 108 may indicate for the usage of previously-provided payment details in funding the e-commerce transaction. For example, the consumer 108 may be provided with a prompt, drop-down box, or other selection tool for the selection of a previously-registered transaction account, such as by selecting a transaction account identified using the last four numbers of the corresponding transaction account number.

The COF entity server 102 may then electronically transmit transaction data for the e-commerce transaction, as well as the merchant-specific payment token indicated by the consumer 108 and the merchant-specific identifier (e.g., or COF token identifier, as applicable) to an acquirer 114. The transaction data may be any additional data suitable for use in the processing of an e-commerce transaction, such as a transaction amount, transaction time, transaction data, geographic location, merchant identifier, point of sale data, product data, offer data, reward data, loyalty data, etc. The acquirer 114 may be a financial institution, such as an acquiring bank, or other entity configured to store, manage, issue, or otherwise be associated with a transaction account issued to the COF entity server 102 or entity associated therewith for use in receiving funds in an e-commerce transaction.

The acquirer 114 may then generate a transaction message for the payment transaction. The transaction message may be a data message specially formatted pursuant to one or more standards governing the exchange of financial transaction messages, such as the International Organization for Standardization's ISO 8583 standard. The transaction message may include a plurality of data elements configured to store data associated with the payment transaction, such as a first data element configured to store a transaction amount, a second data element configured to store a transaction time, etc. The transaction message may also include a message type indicator indicative of a type of the transaction message, such as a message type indicator indicative of an authorization request for transaction messages originating from the acquirer 114 seeking authorization of the related payment transaction. The transaction message may also include a bitmap, which may indicate the data elements included therein and the data values the data elements are configured to store.

The transaction message generated by the acquirer 114 may include, in addition to other data elements used in the processing of the payment transaction, a data element configured to store the COF-specific payment token and a data element configured to store the specific TRID or token identifier. In some instances, the transaction message may also include a data element configured to store data indicating that the payment transaction is an e-commerce transaction. The acquirer 114 may electronically transmit the generated transaction message to a payment network 116 using payment rails. As discussed in more detail below with respect to the process illustrating in FIG. 8, the payment rails may be a specialized communication network and infrastructure associated with a payment network 116 for the conveyance of transaction messages.

The payment network 116 may receive the transaction message and may parse the data stored in the data elements included therein. The payment network 116 may identify the COF-specific payment token stored in the corresponding data element, and then forward the transaction message to the validation server 104. In some embodiments, the payment network 116 may only forward the COF-specific payment token and identifier or token identifier, as well as any other data suitable for use in performing the functions discussed herein (e.g., such as a cryptogram, as discussed below), to the validation server 104. In some embodiments, the data may be electronically transmitted to the validation server 104 using the payment rails. In other embodiments, a suitable alternative communication network may be used, such as the Internet. In some cases, the validation server 104 may be a part of the payment network 116. In such cases, the validation server 104 may receive the transaction message or data using internal communication networks and methods, or, in some instances, may receive the transaction message directly from the acquirer 114 using the payment rails.

The validation server 104 may then validate the COF entity server 102 from which the transaction originated as authorized to use the COF-specific payment token. The validation may be based on the specific TRID or token identifier stored in the corresponding data element included in the transaction message. The validation server 104 may validate that the COF entity server 102 (e.g., via the acquirer 114) provided the specific TRID or token identifier that is associated with the specific COF-specific payment token used in the e-commerce transaction. If an incorrect specific TRID or token identifier is provided, then the validation server 104 may indicate to the payment network 116 that the payment transaction is to be denied. The payment network 116 may then process the payment transaction accordingly using traditional methods and systems for the processing of a denied payment transaction.

If the correct specific TRID or token identifier is provided, then the validation server 104 may swap the COF-specific payment token for the corresponding transaction account number that was provided or otherwise acquired in the registration process for the COF-specific payment token. In some embodiments, the validation server 104 may provide the transaction account number to the payment network 116, which may then replace the COF-specific payment token with the transaction account number in the corresponding data element of the transaction message. In other embodiments, the validation server 104 may directly replace the COF-specific payment token with the transaction account number and return the transaction message, now with the transaction account number, to the payment network 116.

Once the payment network 116 has the transaction message with the transaction account number, the payment network 116 may process the payment transaction using traditional methods and systems, such as using the process 800 illustrated in FIG. 8 and discussed in more detail below. In an exemplary embodiment, the transaction account number may be replaced with the COF-specific payment token (e.g., by the payment network 116 or validation server 104) prior to the transmission of a return transaction message (e.g., an authorization response) to the acquirer 114 indicating of the payment transaction was approved or denied by the issuer 112. In such an embodiment, the acquirer 114 and COF entity server 102 may not possess, see, or otherwise be exposed to the transaction account number during the processing of e-commerce transactions. In instances where the registration was performed without using the transaction account number (e.g., using authentication data), the COF entity server 102 and acquirer 114 may never be exposed to the transaction account number, thereby increasing account security, which may, in turn, decrease the likelihood of an attack on the COF entity server 102.

Using the methods and systems discussed herein, e-commerce transactions may be conducted with payment data stored in a COF entity server 102 with a significantly higher level of security via the use of COF-specific payment tokens.

By using payment tokens that are COF entity-specific and validated to the specific COF entity from which the token originates in a transaction, a consumer's transaction account number may be at a significantly lower risk of compromise, as the transaction account number may never be known to any entity or system outside of the payment network 116, validation server 104, and issuer 112. As a result, a consumer 108, COF entity server 102, and acquirer 114 may have a significantly lower chance of being compromised due to the ongoing storage of payment details, while still being provided with the ease and convenience of using stored payment details via the use of stored COF-specific payment tokens.

In some embodiments, a wallet provider 106 may be a token requesting entity. In such embodiments, the wallet provider 106 may be associated with an electronic wallet application program stored on and/or executed by the computing device 110. The electronic wallet program may be configured to store payment details associated with a transaction account for conveyance to a COF entity server 102 for use in funding a payment transaction. In some cases, the computing device 110 may electronically transmit payment details from an electronic wallet application program to the COF entity server 102 using a suitable communication method and network, such as via submission through a web page using the Internet for an e-commerce transaction. In other cases, the computing device 110 may electronically transmit a request to the wallet provider 106, which may in turn electronically transmit payment details to the COF entity server 102. In such an embodiment, the wallet provider 106 may register the transaction account with the validation server 104 and receive a COF-specific payment token and specific TRID or token identifier in return for use in place of the transaction account number.

In some embodiments, a cryptogram may be used for even greater enhancement in the validation of a token requesting entity. In such embodiments, the validation server 104 may generate a key. The key may be a private key in a key pair, or may be another type of key suitable for use in the generation of the cryptogram. The key may be provided to the COF entity server 102 (e.g., or other token requesting entity, as applicable, such as the wallet provider 106). The COF entity server 102 may use the key in conjunction with one or more cryptogram generation algorithms known to the validation server 104 to generate a cryptogram. The generated cryptogram may be included in the transaction message submitted to the payment network 116 and conveyed to the validation server 104 during the processing of the payment transaction. The cryptogram may be stored in an additional data element of the transaction message. In some cases, the data element may be a data element reserved for private use according to the associated standards. A bitmap included in the transaction message may indicate the existence of the token requestor validation cryptogram and the corresponding data element. In some instances, the validation server 104 may independently generate the cryptogram using the same key and cryptogram generation algorithm(s) for validation of the cryptogram provided by the COF entity server 102 for enhanced validation of the COF entity server 102 as an authorized user of the COF-specific payment token. In other instances, the validation server 104 may use a public key corresponding to the private key used by the COF entity server 102 to generate the cryptogram in order to validate the generated cryptogram.

In such embodiments, the validation provided by the validation server 104 in the usage of the COF-specific payment token may be further enhanced. Use of the cryptogram may provide greater assurance of the authenticity of the COF entity server 102 that provides a COF-specific payment token to the payment network 116 for use in a payment transaction. The greater assurance may also provide even greater security to the consumer 108, as it may make the compromising of the payment token even more difficult.

COF Entity Server

Figure 2:
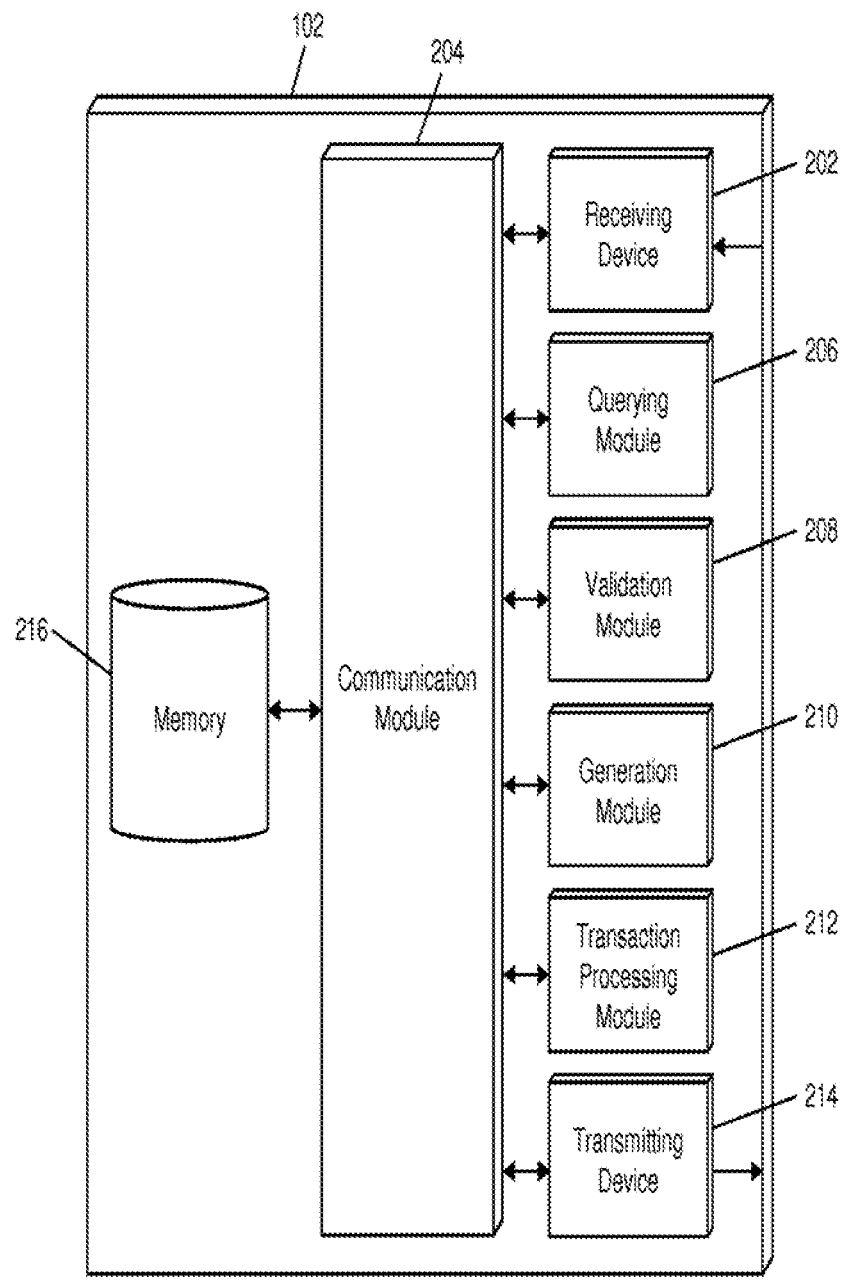
FIG. 2 is a block diagram illustrating the COF entity server of FIG. 1 for the use of a COF token identifier for validation of transaction messages originating therefrom in accordance with exemplary embodiments.

FIG. 2 illustrates an embodiment of the COF entity server 102 of the system 100. It will be apparent to persons having skill in the relevant art that the embodiment of the COF entity server 102 illustrated in FIG. 2 is provided as illustration only and may not be exhaustive to all possible configurations of the COF entity server 102 suitable for performing the functions as discussed herein. For example, the computer system 900 illustrated in FIG. 9 and discussed in more detail below may be a suitable configuration of the COF entity server 102.

The COF entity server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from computing devices 110, validation servers 104, wallet providers 106, payment networks 116, acquirers 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the validation server 104, which may be superimposed with COF-specific payment tokens, specific TRIDs and/or token identifiers, cryptogram generation keys, etc. The receiving device 202 may also be configured to receive data signals electronically transmitted by computing devices 110 and/or wallet providers 106, such as may be superimposed with a COF-specific payment token (e.g., for use in funding a transaction account) or a transaction account number or other registration data, such as authentication data, such as may be used in a registration process for a COF-specific payment token.

The COF entity server 102 may also include a communication module 204. The communication module 204 may be configured to transmit data between modules, engines, databases, memories, and other components of the COF entity server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the COF entity server 102 and external components of the COF entity server 102, such as externally connected databases, display devices, input devices, etc., as well as being configured to establish communication channels with outside systems and devices, such as the electronic point of sale device 104. The COF entity server 102 may also include a processing device. The processing device may be configured to perform the functions of the COF entity server 102 discussed herein as will be apparent to persons having skill in the relevant art. In some embodiments, the processing device may include and/or be comprised of a plurality of engines and/or modules specially configured to perform one or more functions of the processing device, such as a querying module 206, validation module 208, generation module 210, transaction processing module 212, etc. As used herein, the term "module" may be software or hardware particularly programmed to receive an input, perform one or more processes using the input, and provide an output. The input, output, and processes performed by various modules will be apparent to one skilled in the art based upon the present disclosure.

The COF entity server 102 may include a memory 216. The memory 216 may be configured to store data for use by the COF entity server 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing device, and other data that may be suitable for use by the COF entity server 102 in the performance of the functions disclosed herein as will be apparent to persons having skill in the relevant art. The memory 216 may also include or be comprised of a relational database that utilizes structured query language for the storage, identification, modifying, updating, accessing, etc. of structured data sets stored therein.

The memory 216 may be configured to store data suitable for use in performing the functions of the COF entity server 102 discussed herein. The data may include, for example, transaction data for payment transactions being conducted, specific TRIDs and/or token identifiers, and COF-specific payment tokens. In some instances, the memory 216 may only temporarily store a COF-specific payment token, such as in instances where a COF-specific payment token is provided by a wallet provider 106 only for use in a single payment transaction.

The COF entity server 102 may also include a querying module 206. The querying module 206 may be configured to execute queries on databases to identify information. The querying module 206 may receive one or more data values or query strings, and may execute a query string based thereon on an indicated database, such as the memory 216, to identify information stored therein. The querying module 206 may then output the identified information to an appropriate engine or module of the COF entity server 102 as necessary. The querying module 206 may, for example, execute a query on the memory 206 to identify a structured data set. For instance, when an e-commerce transaction is initiated by a consumer 108, the querying module 206 may execute a query on the memory 216 to identify a COF-specific payment token and COF token identifier to convey to the acquirer 114 for the transaction. The COF-specific payment token may be identified based on data submitted by the consumer 108, such as account information (e.g., used for authentication, such as a username, password, e-mail address, etc.) and an indicator associated with the COP-specific payment token, such as an identification value (e.g., the last four digits of the COF-specific payment token).

The COF entity server 102 may also include a validation module 208. The validation module 208 may receive data as input, may validate the data, and may then output a result of the validation (e.g., success or failure) to one or more modules or engines of the COF entity server 102 for use thereof. The validation module 208 may be configured, for example, to validate authentication information submitted by a consumer 108 prior to selection and use of a COF-specific payment token. For example, each consumer 108 for whom a COF-specific payment token is registered and stored in or on behalf of the COF entity server 102 may have an account registered with the COF entity server 102. The validation module 208 may validate authentication information provided by the consumer 108 (e.g., via the computing device 110) prior to conveyance of the indicated COF-specific payment token to the acquirer 114, such as to ensure that the consumer 108 attempting to use the COF-specific payment token is an authorized party.

The COF entity server 102 may also include a generation module 210. The generation module 210 may be configured to receive instructions as input, which may include data for use in association with the instructions, may generate data based on the instructions, and may be configured to output the generated data to one or more modules or engines of the COF entity server 102 for use in conjunction with the functions discussed herein. For example, the generation module 210 may be configured to generate data signals superimposed with data for electronic transmission to other entities in the system 100, such as a data message for registration of a transaction account for a COF-specific payment token and a data message for providing transaction data and COF entity-specific data for use in processing a payment transaction. The generation module 210 may also be configured to generate token validation cryptograms. The cryptograms may be generated using a COF entity-specific key issued by the validation module 104 that corresponds to a COF-specific payment token. The generation module 210 may apply one or more cryptogram generation algorithms (e.g., specified by the validation module 104 when issuing the key(s)) to a key to generate a token requestor validation cryptogram, which may be included in the data conveyed to the acquirer 114 for inclusion in a transaction message for the payment transaction.

The COF entity server 102 may also include a transaction processing module 212. The transaction processing module 212 may be configured to perform additional functions of the COF entity server 102 suitable for use in the initiation and processing of e-commerce payment transactions. For example, the transaction processing module 212 may be configured to calculate transaction amounts, apply taxes to a transaction, calculate fraud scores, display notifications to employees and consumers 108, etc. Additional functions that may be performed by the transaction processing module 212 in conjunction with the initiation and processing of payment transactions will be apparent to persons having skill in the relevant art.

The COF entity server 102 may also include a transmitting device 214. The transmitting device 214 may be configured to transmit data over one or more networks via one or more network protocols. In some embodiments, the transmitting device 214 may be configured to transmit data over the payment rails, such as using specially configured infrastructure associated with payment networks 116 for the transmission of transaction messages that include sensitive financial data and information, such as identified payment credentials. In some instances, the transmitting device 214 may be configured to transmit data to validation servers 104, wallet providers 106, computing devices 110, acquirers 114, payment networks 116, and other entities via alternative networks, such as the Internet. In some embodiments, the transmitting device 214 may be comprised of multiple devices, such as different transmitting devices for transmitting data over different networks, such as a first transmitting device for transmitting data over the payment rails and a second transmitting device for transmitting data over the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to the validation server 104, which may be superimposed with registration data. Registration data may include, for example, a transaction account number for a transaction account being registered, authentication data for authentication of the COF entity server 102 as authorized to register a transaction account, such as username and password combination used by the consumer 108 in association with the transaction account being registered. The transmitting device 214 may also be configured to electronically transmit data signals to acquirers 114, which may be superimposed with data used in the processing of payment transactions, such as transaction data (e.g., transaction amounts, transaction times, transaction dates, etc.) and COF entity-specific data, such as a COF-specific payment token, specific TRID or token identifier, and a COF token requestor validation cryptogram, if applicable.

Validation Server

Figure 3:
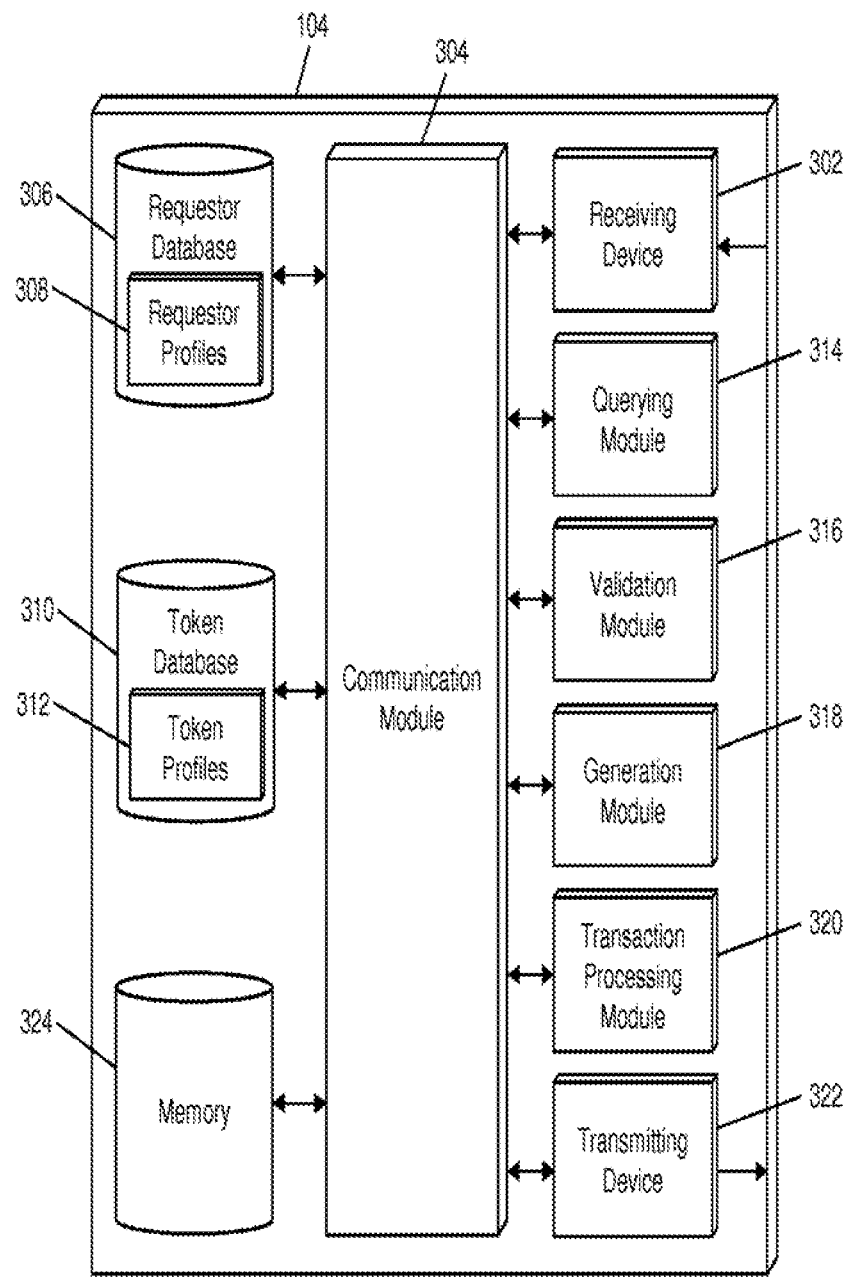
FIG. 3 is a block diagram illustrating the validation server of FIG. 1 for the enhanced validation of transaction messages originating from COF entity servers using COF token identifiers in accordance with exemplary embodiments.

FIG. 3 illustrates an embodiment of the validation server 104 of the system 100. It will be apparent to persons having skill in the relevant art that the embodiment of the validation server 104 illustrated in FIG. 3 is provided as illustration only and may not be exhaustive to all possible configurations of the validation server 104 suitable for performing the functions as discussed herein. For example, the computer system 900 illustrated in FIG. 9 and discussed in more detail below may be a suitable configuration of the validation server 104.

The validation server 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 116 for the transmission of transaction messages that include sensitive financial data and information. In some instances, the receiving device 302 may also be configured to receive data from COF entity servers 102, wallet providers 106, computing devices 110, issuers 112, acquirers 114, payment networks 116, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by COF entity servers 102 or wallet providers 106, which may include data suitable for use in the registration of a transaction account by a token requesting entity, such as a transaction account number or authentication data associated with a transaction account. The receiving device 302 may also be configured to receive data signals electronically transmitted by a payment network 116, which may be superimposed with a transaction message or data stored therein, such as COF entity-specific data used in the validation of a token requesting entity.

The validation server 104 may also include a communication module 304. The communication module 304 may be configured to transmit data between modules, engines, databases, memories, and other components of the validation server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the validation server 104 and external components of the validation server 104, such as externally connected databases, display devices, input devices, etc., as well as being configured to establish communication channels with outside systems and devices, such as the electronic point of sale device 104. The validation server 104 may also include a processing device. The processing device may be configured to perform the functions of the validation server 104 discussed herein as will be apparent to persons having skill in the relevant art. In some embodiments, the processing device may include and/or be comprised of a plurality of engines and/or modules specially configured to perform one or more functions of the processing device, such as a querying module 314, validation module 316, generation module 318, transaction processing module 320, etc. As used herein, the term "module" may be software or hardware particularly programmed to receive an input, perform one or more processes using the input, and provide an output. The input, output, and processes performed by various modules will be apparent to one skilled in the art based upon the present disclosure.

The validation server 104 may include a memory 316. The memory 316 may be configured to store data for use by the validation server 104 in performing the functions discussed herein. The memory 316 may be configured to store data using suitable data formatting methods and schema and may be any suitable type of memory, such as read-only memory, random access memory, etc. The memory 316 may include, for example, encryption keys and algorithms, communication protocols and standards, data formatting standards and protocols, program code for modules and application programs of the processing device, and other data that may be suitable for use by the validation server 104 in the performance of the functions disclosed herein as will be apparent to persons having skill in the relevant art. The memory 316 may also include or be comprised of a relational database that utilizes structured query language for the storage, identification, modifying, updating, accessing, etc. of structured data sets stored therein.

The validation server 104 may also include a requestor database 306. The requestor database 306 may be configured to store a plurality of requestor profiles 308 using a suitable data storage format and schema. The requestor database 306 may be a relational database that utilizes structured query language for the storage, identification, modifying, updating, accessing, etc. of structured data sets stored therein. Each requestor profile 308 may be a structured data set configured to store data associated with a token requesting entity. Each requestor profile 308 may include a COF-specific payment token and an associated specific TRID or token identifier. In some instances, a single specific TRID may be associated with multiple COF-specific payment tokens. In some embodiments, a requestor profile 308 may also include a key distributed to the associated token requesting entity for use in generating token requestor validation cryptograms.

The validation server 104 may also include a token database 310. The token database 310 may be configured to store a plurality of token profiles 312 using a suitable data storage format and schema. The token database 310 may be a relational database that utilizes structured query language for the storage, identification, modifying, updating, accessing, etc. of structured data sets stored therein. Each token profile 312 may be a structured data set configured to store data associated with an issued COF-specific payment token. Specifically, a token profile 312 may include a COF-specific payment token and the associated transaction account number. In some embodiments, token profiles 312 may be stored in the corresponding requestor profiles 308, such as in a requestor profile 308 that includes or is otherwise associated with the COF-specific payment token included in the token profile 312.

The validation server 104 may also include a querying module 314. The querying module 314 may be configured to execute queries on databases to identify information. The querying module 314 may receive one or more data values or query strings, and may execute a query string based thereon on an indicated database, such as the memory 316, to identify information stored therein. The querying module 314 may then output the identified information to an appropriate engine or module of the validation server 104 as necessary. The querying module 314 may, for example, execute a query on the requestor database 306 to identify a requestor profile 308 that includes a COF-specific payment token received by the receiving device 302, such as from the payment network 116. The querying module 314 may also execute queries on the token database 310 to identify specific token profiles 312, or on any database in the validation server 104 to perform database management functions, such as for the storage, modification, editing, etc. of structured data sets stored therein.

The validation server 104 may also include a validation module 316. The validation module 316 may receive data as input, may validate the data, and may then output a result of the validation (e.g., success or failure) to one or more modules or engines of the validation server 104 for use thereof. The validation module 316 may be configured, for example, to validate authentication information submitted by a COF entity server 102 in authenticating the COF entity server 102 as authorized access to a transaction account with an issuer 112, for registration of the transaction account with a COF-specific payment token. The validation module 316 may also be configured to validate COF entity-specific data received in conjunction with a payment transaction. For example, the validation module 316 may validate that a specific TRID or token identifier received in a payment transaction (e.g., stored in a corresponding data element included in a submitted transaction message) is correctly associated with a COF-specific payment token also received in the payment transaction. In instances where a token requestor validation cryptogram may be used, the validation module 316 may also be configured to validate that the cryptogram received in the payment transaction, such as by comparison to an independently generated cryptogram or validation using a public key corresponding to a private key used in the generation of the cryptogram.

The validation server 104 may also include a generation module 318. The generation module 318 may be configured to receive instructions as input, which may include data for use in association with the instructions, may generate data based on the instructions, and may be configured to output the generated data to one or more modules or engines of the validation server 104 for use in conjunction with the functions discussed herein. For example, the generation module 318 may be configured to generate data signals superimposed with data for electronic transmission to other entities in the system 100, such as a data message to the COF entity server 102 superimposed with COF entity-specific data generated in the registration process, a data message to the payment network 116 superimposed with data used in the processing of e-commerce transactions, such as indications of failed validations, transaction account numbers for swapping, or modified transaction messages that include transaction account numbers.

The generation module 318 may also be configured to generate COF-specific payment tokens using suitable methods, as well as to generate specific TRIDs and/or token identifiers. In instances where token requestor validation cryptograms may be used, the generation module 318 may also be configured to generate keys using a suitable key generation algorithm for used in the generation of token requestor validation cryptograms. In such instances, the generation module 318 may also be configured to generate token validation cryptograms. The cryptograms may be generated using the COF entity-specific key. The generation module 318 may apply one or more cryptogram generation algorithms (e.g., specified by the validation module 104 when issuing the key(s)) to a key to generate a token requestor validation cryptogram, which may be used in the validation of a token requestor validation cryptogram included in the received transaction message.

The validation server 104 may also include a transaction processing module 320. The transaction processing module 320 may be configured to perform additional functions of the validation server 104 suitable for use in the initiation and processing of e-commerce payment transactions. For example, the transaction processing module 320 may be configured to calculate fraud scores, modify data elements, generate authorization responses, etc. Additional functions that may be performed by the transaction processing module 320 in conjunction with the initiation and processing of payment transactions will be apparent to persons having skill in the relevant art.

The validation server 104 may also include a transmitting device 322. The transmitting device 322 may be configured to transmit data over one or more networks via one or more network protocols. In some embodiments, the transmitting device 322 may be configured to transmit data over the payment rails, such as using specially configured infrastructure associated with payment networks 116 for the transmission of transaction messages that include sensitive financial data and information, such as identified payment credentials. In some instances, the transmitting device 322 may be configured to transmit data to COF entity servers 102, wallet providers 106, computing devices 110, issuers 112, acquirers 114, payment networks 116, and other entities via alternative networks, such as the Internet. In some embodiments, the transmitting device 322 may be comprised of multiple devices, such as different transmitting devices for transmitting data over different networks, such as a first transmitting device for transmitting data over the payment rails and a second transmitting device for transmitting data over the Internet. The transmitting device 322 may electronically transmit data signals that have data superimposed that may be parsed by a receiving computing device. In some instances, the transmitting device 322 may include one or more modules for superimposing, encoding, or otherwise formatting data into data signals suitable for transmission.

The transmitting device 322 may be configured to electronically transmit data signals to the COF entity server 102, which may be superimposed with registration data. Registration data may include, for example, COF entity-specific data generated during the registration of a transaction account, which may include a COF-specific payment token, specific TRID or token identifier, and a COF entity-specific key, if applicable. The transmitting device 322 may also be configured to electronically transmit data signals to the payment network 116, which may be superimposed with a modified transaction message that includes a transaction account number in place of a COF-specific payment token, or with at least the transaction account number for replacement of the COF-specific payment token by the payment network 116.

Process for Registration of a Token Requesting Entity

Figure 4:
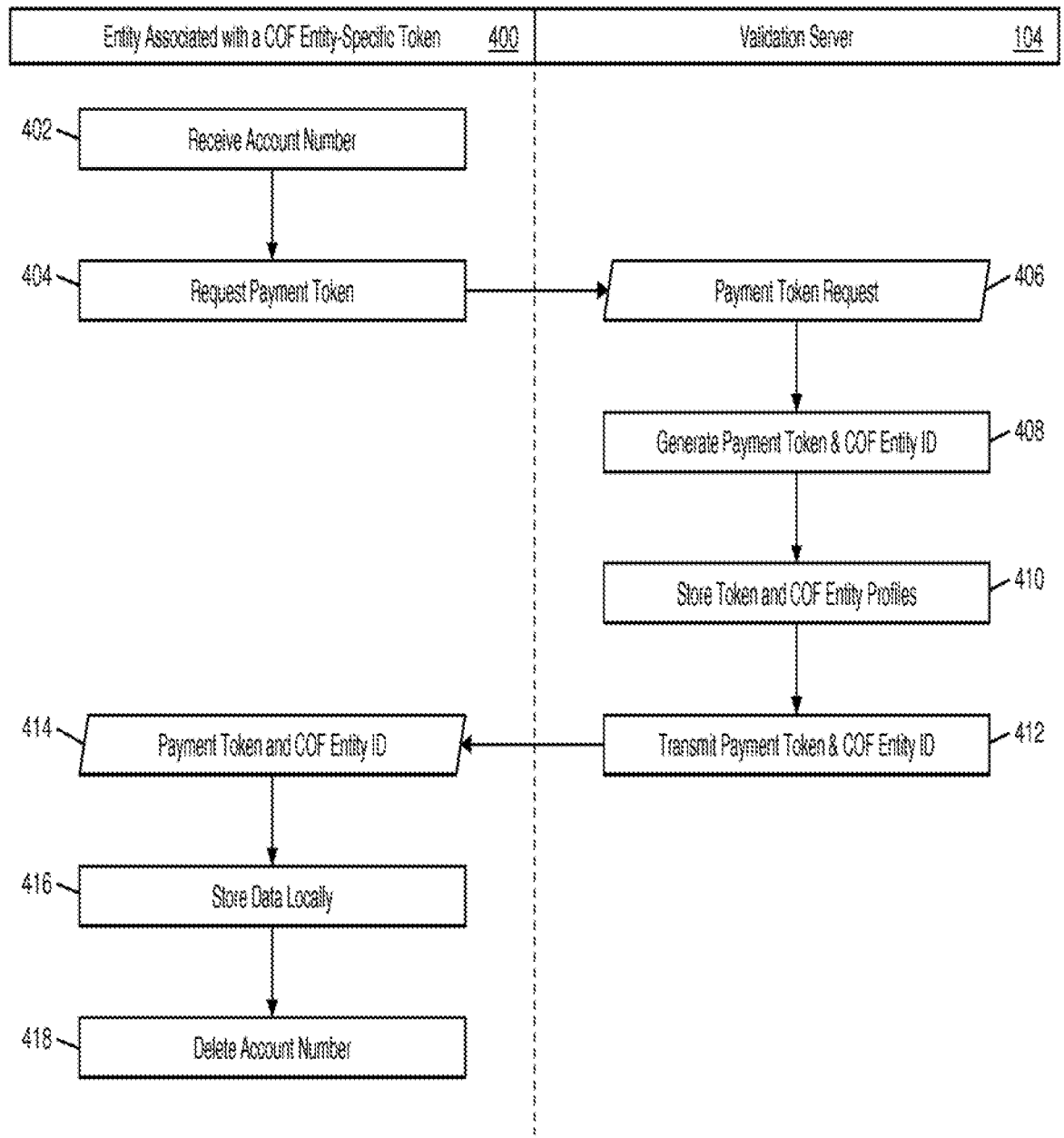
FIG. 4 is a flow diagram illustrating a process for registration of a COF token and identifier for use in enhanced validation in the system of FIG. 1 in accordance with exemplary embodiments.

FIG. 4 illustrates a process for the registration of a transaction account by a token requesting entity for an entity-specific payment token for use in e-commerce payment transactions.

In step 402, the receiving device 202 of a token requesting entity 400 (e.g., the COF entity server 102, wallet provider 106, etc.) may receive a transaction account number for a transaction account for which registration by a consumer 108 (e.g., via the computing device 110) is requested. In some instances, the transaction account number may be accompanied by authentication data. In step 404, the transmitting device 214 of the token requesting entity 400 may electronically transmit a data signal to the validation server 104 superimposed with a payment token request. In step 406, the receiving device 302 of the validation server 104 may receive the payment token request. The payment token request may include at least the transaction account number. In some embodiments, the payment token request may include an entity identifier, such as a token requester identifier (TRID). The entity identifier may be a unique value associated with the token requesting entity 400 that may be different from a specific TRID, and which may be known to outside entities (e.g., the acquirer 114, issuer 112, payment network 116, etc.), but may be suitable for use by the validation server 104 in identifying payment transactions that are associated with the token requesting entity 400.

In step 408, the generation module 318 of the validation server 104 may generate a COF-specific payment token and a specific TRID or token identifier. A specific TRID may be unique to a token requesting entity 400, but may be associated with multiple COF-specific payment tokens. A COF token identifier may be an identification value unique to a specific COF-specific payment token. The COF-specific payment token may be a unique number that may be used in place of a transaction account number in a payment transaction, and may be formatted pursuant to the same standards used in the generation and use of transaction account numbers.

In step 410, the querying module 314 of the validation server 104 may execute queries on the requestor database 306 and token database 310 to store a COF entity profile 308 and token profile 312 for the token requesting entity 400 and COF-specific payment token, respectively. The requestor profile 308 may include at least the token requester identifier (TRID), specific TRID or token identifier provided by and generated for the token requesting entity 400. In some instances, the COF entity profile 308 may also include the COF-specific payment token. The token profile 312 may include at least a transaction account number and the associated COF-specific payment token. In some instances, the token profile 312 may also include a token requester identifier (TRID) or specific TRID or token identifier for use in identifying a COF-specific payment token, such as in instances where one may not be stored in the requestor profile 308.

In step 412, the transmitting device 322 of the validation server 104 may electronically transmit a data signal to the token requesting entity 400 using a suitable communication network that is superimposed with the COF entity-specific data, comprised of at least the COF-specific payment token and specific TRID or token identifier. The token requesting entity would then be a COF entity 102 after receiving and storing the specific TRID and token identifier. In some embodiments, the generation module 318 may generate a COF entity-specific key, which may also be included in the COF entity-specific data transmitted to the COF entity server 102. In step 414, the receiving device 202 of the COF entity server 102 may receive the COF entity-specific data.

In step 416, the querying module 206 of the COF entity server 102 may execute a query on the memory 216 to store the COF entity-specific data therein for use in future payment transactions. In step 418, the querying module 206 of the COF entity server 102 may execute queries on the memory 216 and any additional data storage of the COF entity server 102 to delete the transaction account number that was registered with the validation server 104. Removal of the transaction account number may provide for greater account security for users, as the COF-specific payment token may not be used without also including the specific TRID or token identifier and, if applicable, a cryptogram generated using the COF entity-specific key.

Processing a Payment Transaction with Enhanced Token Requestor Validation

Figure 5A:
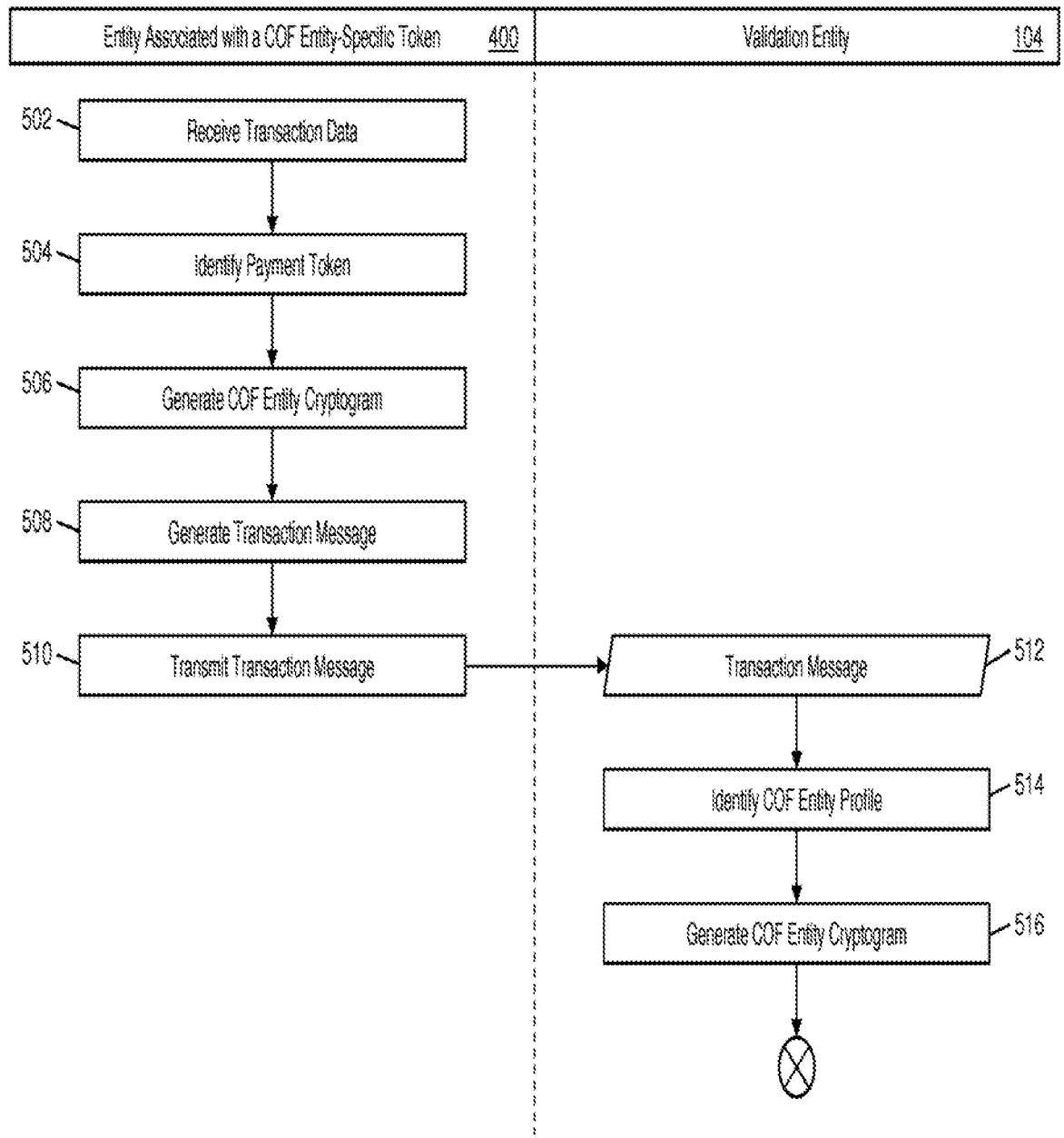
FIGS. 5A and 5B are a flow diagram illustrating a process for enhanced validation of a transaction message and associated COF entity using COF tokens and identifiers in accordance with exemplary embodiments.
Figure 5B:
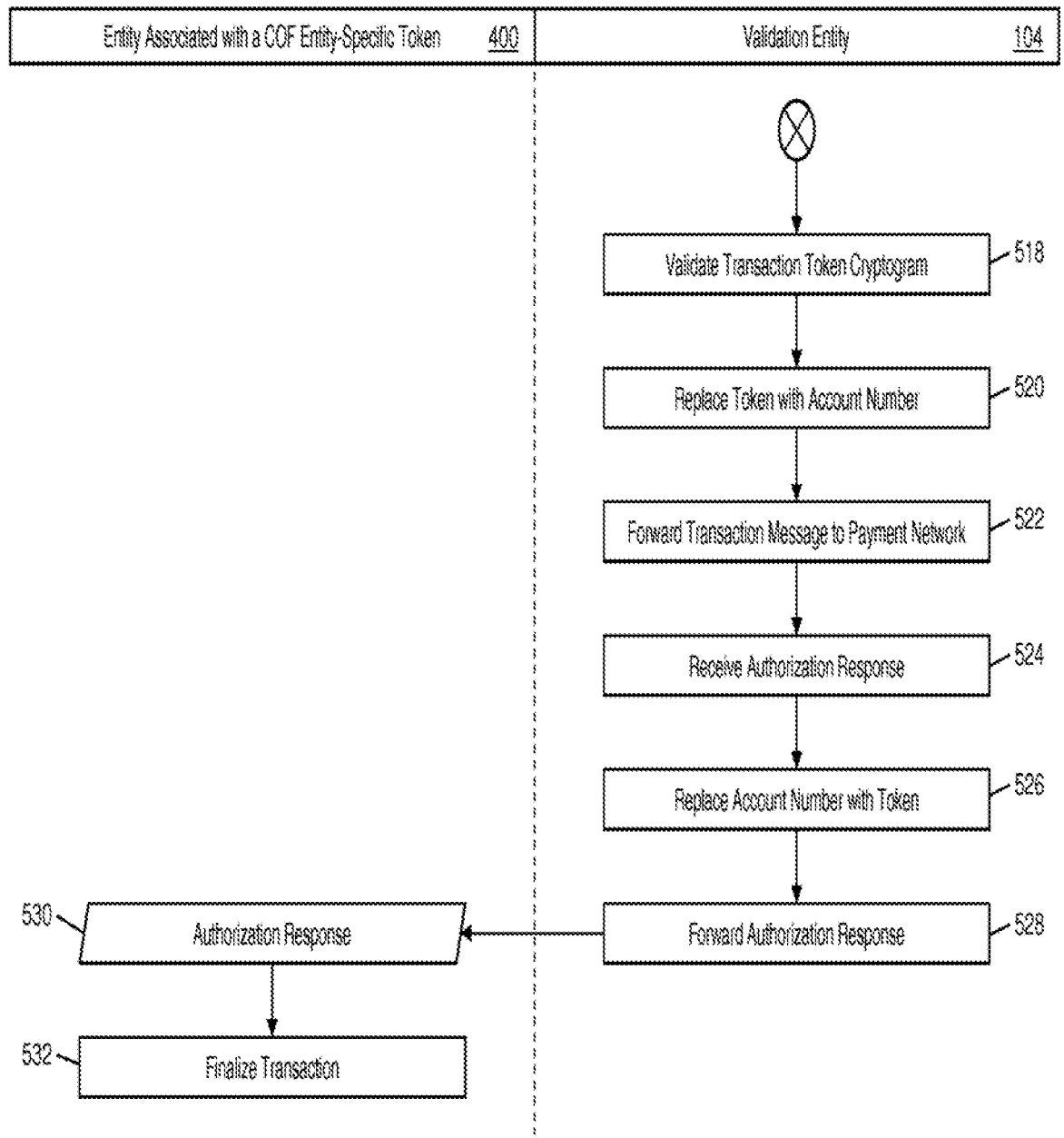

FIGS. 5A and 5B illustrate a process for the processing of an e-commerce payment transaction via a payment token that that includes enhanced validation of the entity associated with the payment token.

In step 502, the receiving device 202 of the COF entity server 102 may receive transaction data for an e-commerce payment transaction. The transaction data may be received from an external computing device, such as the computing device 110 via the Internet or another suitable communication network or an intermediate system (e.g., a web server), or may be received from one or more interfaced input devices, such as a keyboard used by a user of the COF entity server 102. The transaction data may include, for example, a transaction amount, transaction time, transaction date, geographic location, product data, offer data, reward data, loyalty data, etc. The transaction data may also include an indication of a transaction account to be used to fund the e-commerce payment transaction. In some instances, the indication may include or be comprised of authentication data, which may have been supplied by the consumer 108 during the registration of the transaction account.

In step 504, the querying module 314 may execute a query on the memory 216 to identify a COF-specific payment token indicated in the transaction data. In some instances, the COF-specific payment token may be identified via authentication data, or using an identification value associated therewith that may be known and provided by the consumer 108. In step 506, the generation module 210 of the COF entity server 102 may generate a COF entity cryptogram. The COF entity cryptogram may be generated by application of a COF entity-specific key associated with the COF-specific payment token to one or more cryptogram generation algorithms.

In step 508, a transaction message may be generated for the e-commerce payment transaction. In some embodiments, the transaction message may be generated by the generation module 210 of the COF entity server 102. In other embodiments, the transaction message may be generated subsequent to delivery of transaction data and the COF entity-specific data by the transmitting device 214 of the COF entity server 102 to a third party, such as the acquirer 114. The transaction message may be a data message formatted pursuant to one or more standards, such as the ISO 8583 standard, which may include a plurality of data elements including at least a first data element configured to store the COF-specific payment token, a second data element configured to store the specific TRID or token identifier, a third data element configured to store the token requester identifier (TRID), a fourth data element configured to store a token requestor validation cryptogram, and one or more additional data elements configured to store the transaction data.

In step 510, the transaction message may be electronically transmitted to the validation 104 via one or more intermediate entities, such as the acquirer 114, payment network 116, etc., using the payment rails associated with the payment network 116. In some embodiments, the payment network 116 may receive the transaction message and may parse the data stored therein and only include the COF entity-specific data in a transmission to the validation server 104 for validation. In step 512, the receiving device 302 of the validation server 104 may receive the transaction message and/or data stored therein.

In step 514, the querying module 314 of the validation server 104 may execute a query on the requestor database 306 to identify a requestor profile 308 associated with the COF entity server 102. The requestor profile 308 may be identified by the inclusion of a token requester identifier (TRID) that corresponds to the token requester identifier (TRID) stored in the third data element included in the transaction message. In step 516, the generation module 318 of the validation server 104 may independently generate a COF entity validation cryptogram, which may be generated via application of the COF entity-specific key stored in the identified requestor profile 308 to the same one or more cryptogram generation algorithms used by the COF entity server 102. In some instances, the cryptogram generation algorithms used in the generation of the token requestor validation cryptogram may be specified during the registration process.

In step 518, the validation module 316 of the validation server 104 may validate the token requestor validation cryptogram stored in the fourth data element included in the received transaction message. The validation may be successful if the token requestor validation cryptogram included in the received transaction message matches the token requestor validation cryptogram independently generated by the generation module 318 of the validation server. The validation may also include validation of the specific TRID or token identifier included in the received transaction message as matching the corresponding values stored in the identified requestor profile 308. Once the token requestor validation cryptogram and COF token identifier are validated (e.g., and thus supplied by the appropriate token requesting entity 400), then, in step 520, the COF-specific payment token stored in the first data element included in the received transaction message may be replaced by the associated transaction account number. Replacement of the COF-specific payment token may include the execution of a query by the querying module 314 of the validation server 104 on the token database 310 to identify a specific token profile 312 that includes the COF-specific payment token stored in the first data element. Any suitable module or engine of the validation server 104 may be used to replace the COF-specific payment token with the associated transaction account number stored in the identified token profile 312, such as via execution of a query by the querying module 314, generation of a new transaction message by the generation module 318, etc.

In step 522, the transmitting device 322 of the validation server 104 may electronically transmit the transaction message with the transaction account number to the payment network 116. The payment network 116 may then process the transaction using traditional methods and systems. As part of the processing of the payment transaction, the payment network 116 may receive a transaction message from the issuer 112 that includes a message type indicator indicative of an authorization response, where one of the data elements included therein includes a response code indicative of approval or denial of the e-commerce payment transaction. In step 524, the receiving device 302 of the validation server 104 may receive the authorization response, and then, in step 526, a suitable module or engine of the validation server 104 may swap the transaction account number stored in the first data element back for the corresponding COF-specific payment token. In some embodiments, the swap may be performed by the payment network 116.

In step 528, the transmitting device 322 of the validation server 104 may forward the authorization response that includes the swapped COF-specific payment token to the COF entity server 102, which may utilize one or more intermediate entities in the transmission thereof such as the payment network 116 and acquirer 114. In step 530, the receiving device 202 of the COF entity server 102 may receive the authorization response. In step 532, the COF entity server 102 may finalize the e-commerce payment transaction accordingly, based on what is indicated by the response code stored in the corresponding data element included in the authorization response. For example, if the transaction is approved, the token requesting entity 400 may begin to furnish the consumer 108 with transacted-for goods or services.

Figure 6:
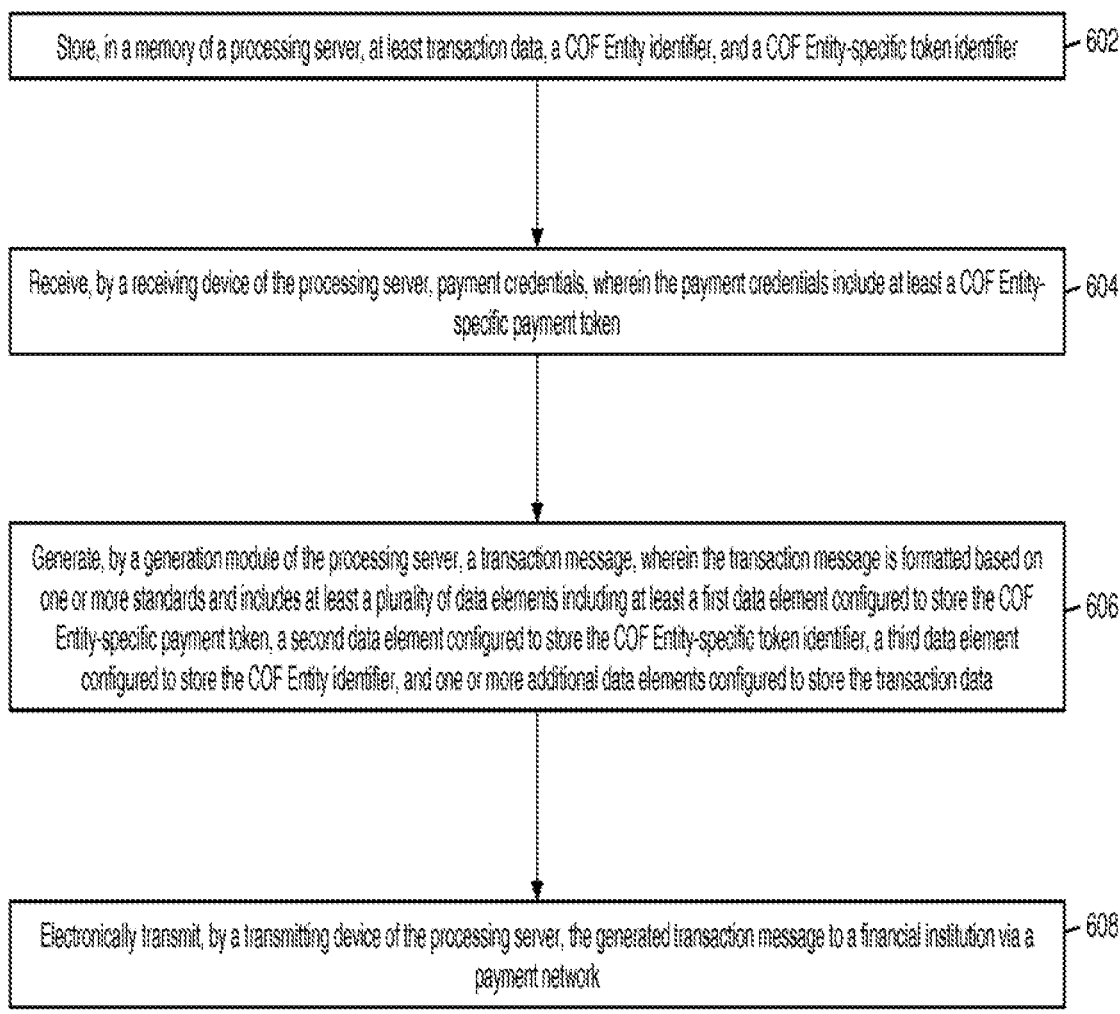
FIGS. 6 and 7 are flow charts illustrating exemplary methods for conducting of an offline data exchange associated with a blockchain in accordance with exemplary embodiments.

First Exemplary Method for Enhanced Validation of an Entity Associated with a COF Token FIG. 6 illustrates a process 600 for the enhanced validation of a token requesting entity that is associated with a COF token using a unique combination of a COF-specific payment token and specific TRID.

In step 602, at least transaction data, a token requester identifier (TRID), and a COF token identifier may be stored in a memory (e.g., the memory 216) of a processing server (e.g., the COF entity server 102). In step 604, payment credentials may be received by a receiving device (e.g., the receiving device 202) of the processing server, wherein the payment credentials include at least a COF-specific payment token.

In step 606, a transaction message may be generated by a generation module (e.g., the generation module 210) of the processing server, wherein the transaction message is formatted based on one or more standards and includes at least a plurality of data elements including at least a first data element configured to store the COF-specific payment token, a second data element configured to store the COF token identifier, a third data element configured to store the token requester identifier (TRID), and one or more additional data elements configured to store the transaction data. In step 608, the generated transaction message may be electronically transmitted by a transmitting device (e.g., the transmitting device 214) of the processing server to a financial institution via a payment network (e.g., the payment network 116).

In some embodiments, the generated transaction message may further include a fifth data element configured to store an indicator indicating that the generated transaction message is related to an e-commerce transaction. In one embodiment, the method 600 may also include generating, by the generation module of the processing server, a COF entity validation cryptogram based on application of one or more algorithms to data associated with the COF token identifier, wherein the generated transaction message further includes a fourth data element configured to store the generated COF entity validation cryptogram. In a further embodiment, the method 600 may further include storing, in the memory of the processing server, a key corresponding to a key pair, wherein the key is associated with the COF token identifier and is used in generating the COF entity validation cryptogram. In another further embodiment, the fourth data element may be reserved for private use in the one or more standards.

Figure 7:
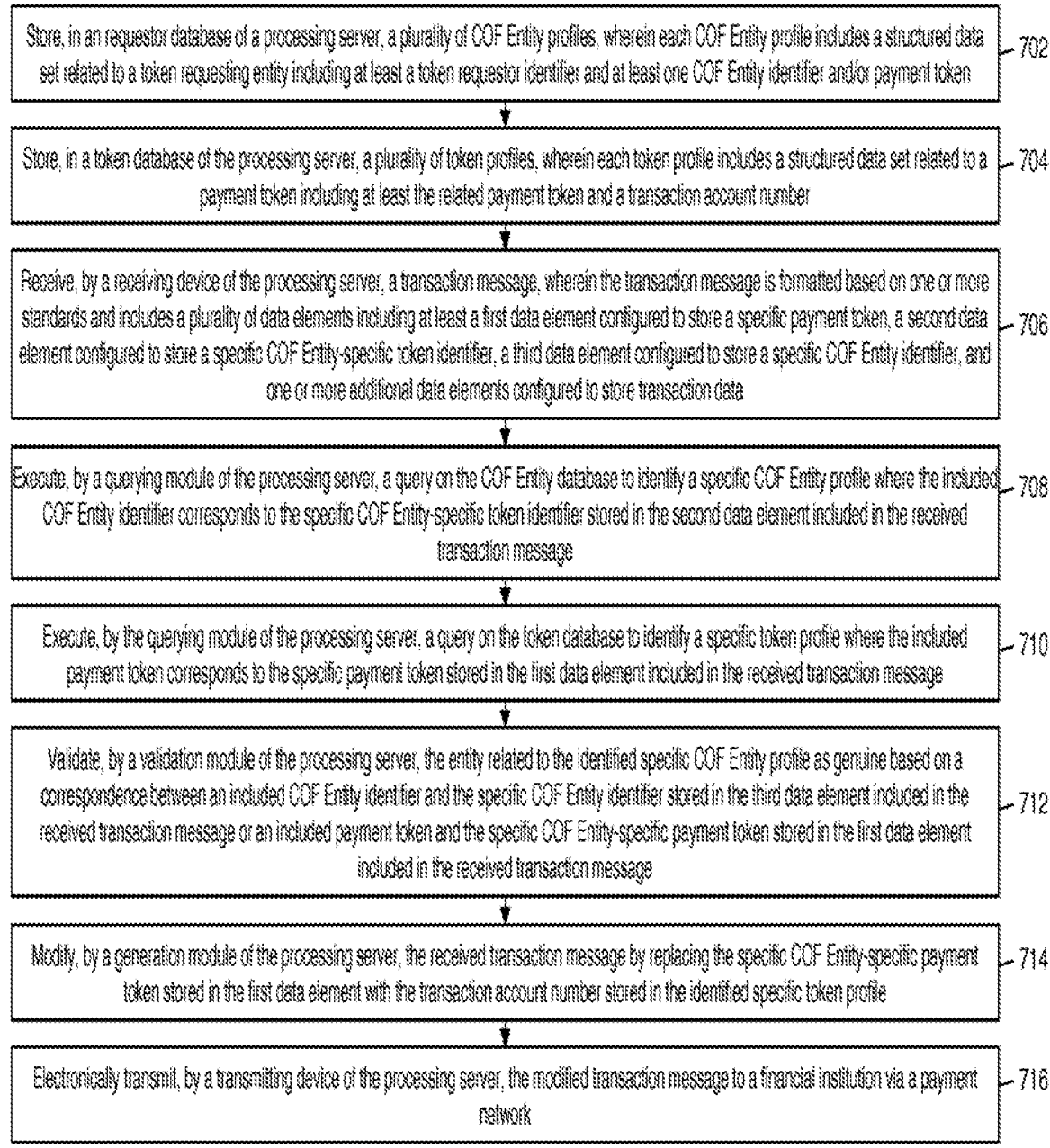

Second Exemplary Method for Enhanced Validation of an Entity Associated with a COF Token FIG. 7 illustrates a process for the enhanced validation of a COF entity server 102 that is associated with a COF token using a unique combination of a COF-specific payment token and specific TRID.

In step 702, a plurality of COF entity profiles (e.g., requestor profiles 308) may be stored in a COF entity database (e.g., requestor database 306) of a processing server (e.g., validation server 104), wherein each COF entity profile includes a structured data set related to an entity associated with a COF token including at least a COF token identifier and at least one token requester identifier (TRID) and/or COF-specific payment token. In step 704, a plurality of token profiles (e.g., token profiles 312) may be stored in a token database (e.g., token database 310) of the processing server, wherein each token profile includes a structured data set related to a COF-specific payment token including at least the related COF-specific payment token and a transaction account number.

In step 706, a transaction message may be received by a receiving device (e.g., the receiving device 302) of the processing server, wherein the transaction message is formatted based on one or more standards and includes a plurality of data elements including at least a first data element configured to store a specific payment token, a second data element configured to store a specific COF token identifier, a third data element configured to store a specific token requester identifier (TRID), and one or more additional data elements configured to store transaction data. In step 708, a query may be executed on the COF entity database by a querying module (e.g., the querying module 314) of the processing server to identify a specific COF entity profile where the included COF token identifier corresponds to the specific COF token identifier stored in the second data element included in the received transaction message.

In step 710, a query may be executed by the querying module of the processing server on the token database to identify a specific token profile where the included payment token corresponds to the specific COF-specific payment token stored in the first data element included in the received transaction message. In step 712, a validation module (e.g., the validation module 316) of the processing server may validate the entity related to the identified specific COF entity profile as genuine based on a correspondence between an included token requester identifier (TRID) and the specific token requester identifier (TRID) stored in the third data element included in the received transaction message or an included COF-specific payment token and the specific COF-specific payment token stored in the first data element included in the received transaction message.

In step 714, the received transaction message may be modified by a generation module (e.g., the generation module 318) of the processing server by replacing the specific payment token stored in the first data element with the transaction account number stored in the identified specific token profile. In step 716, the modified transaction message may be electronically transmitted by a transmitting device (e.g., the transmitting device 322) of the processing server to a financial institution via a payment network (e.g., the payment network 116).

In one embodiment, the method may further include generating, by the generation module of the processing server, a COF entity validation cryptogram based on application of one or more algorithms to data associated with the specific COF token identifier, wherein the received transaction message further includes a fourth data element configured to store a supplied COF entity validation cryptogram, and validation of the entity related to the identified specific COF entity profile as genuine further includes validating the supplied COF entity validation cryptogram based on the generated COF entity validation cryptogram. In a further embodiment, the method may even further include storing, in the specific COF entity profile, a key corresponding to a key pair, wherein the key is associated with the specific COF token identifier and is used in generating the COF entity validation cryptogram. In another further embodiment, the fourth data element may be reserved for provide use in the one or more standards. In some embodiments, the generated transaction message may further include a fifth data element configured to store an indicator indicating that the generated transaction message is related to an e-commerce transaction.

Payment Transaction Processing System and Process

Figure 8:
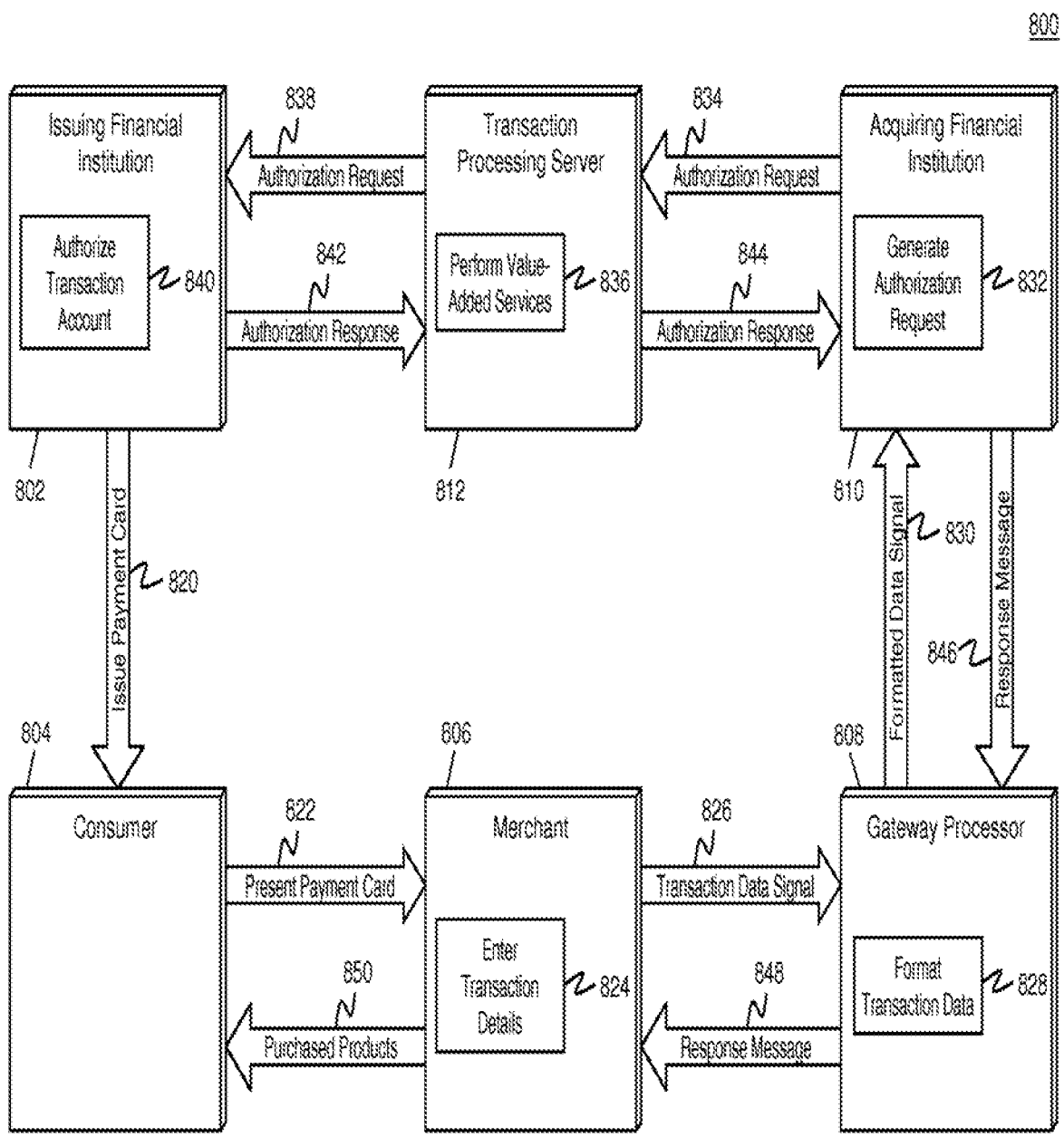
FIG. 8 is a flow diagram illustrating the processing of a payment transaction in accordance with exemplary embodiments.

FIG. 8 illustrates a transaction processing system and a process 800 for the processing of payment transactions in the system. The process 800 and steps included therein may be performed by one or more components of the system 100 discussed above, such as the merchant (the COF entity in this example) server 102, validation server 104, wallet provider 106, consumer 108, computing device 110, issuer 112, acquirer 114, payment network 116, etc. The processing of payment transactions using the system and process 800 illustrated in FIG. 8 and discussed below may utilize the payment rails, which may be comprised of the computing devices and infrastructure utilized to perform the steps of the process 800 as specially configured and programmed by the entities discussed below, including the transaction processing server 812, which may be associated with one or more payment networks configured to processing payment transactions. It will be apparent to persons having skill in the relevant art that the process 800 may be incorporated into the processes illustrated in FIGS. 4, 5A, 5B, 6 and 7, discussed above, with respect to the step or steps involved in the processing of a payment transaction. In addition, the entities discussed herein for performing the process 800 may include one or more computing devices or systems configured to perform the functions discussed below. For instance, the merchant 806 may be comprised of one or more point of sale devices, a local communication network, a computing server, and other devices configured to perform the functions discussed below.

In step 820, an issuing financial institution 802 may issue a payment card or other suitable payment instrument to a consumer 804. The issuing financial institution may be a financial institution, such as a bank, or other suitable type of entity that administers and manages payment accounts and/or payment instruments for use with payment accounts that can be used to fund payment transactions. The consumer 804 may have a transaction account with the issuing financial institution 802 for which the issued payment card is associated, such that, when used in a payment transaction, the payment transaction is funded by the associated transaction account. In some embodiments, the payment card may be issued to the consumer 804 physically. In other embodiments, the payment card may be a virtual payment card or otherwise provisioned to the consumer 804 in an electronic format.

In step 822, the consumer 804 may present the issued payment card to a merchant 806 for use in funding a payment transaction. The merchant 806 may be a business, another consumer, or any entity that may engage in a payment transaction with the consumer 804. The payment card may be presented by the consumer 804 via providing the physical card to the merchant 806, electronically transmitting (e.g., via near field communication, wireless transmission, or other suitable electronic transmission type and protocol) payment details for the payment card, or initiating transmission of payment details to the merchant 806 via a third party. The merchant 806 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 824, the merchant 806 may enter transaction details into a point of sale computing system. The transaction details may include the payment details provided by the consumer 804 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 806 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 806 may be an online retailer in an e-commerce transaction. In such embodiments, the transaction details may be entered in a shopping cart or other repository for storing transaction data in an electronic transaction as will be apparent to persons having skill in the relevant art.

In step 826, the merchant 806 may electronically transmit a data signal superimposed with transaction data to a gateway processor 808. The gateway processor 808 may be an entity configured to receive transaction details from a merchant 806 for formatting and transmission to an acquiring financial institution 810. In some instances, a gateway processor 808 may be associated with a plurality of merchants 806 and a plurality of acquiring financial institutions 810. In such instances, the gateway processor 808 may receive transaction details for a plurality of different transactions involving various merchants, which may be forwarded on to appropriate acquiring financial institutions 810. By having relationships with multiple acquiring financial institutions 810 and having the requisite infrastructure to communicate with financial institutions using the payment rails, such as using application programming interfaces associated with the gateway processor 808 or financial institutions used for the submission, receipt, and retrieval of data, a gateway processor 808 may act as an intermediary for a merchant 806 to be able to conduct payment transactions via a single communication channel and format with the gateway processor 808, without having to maintain relationships with multiple acquiring financial institutions 810 and payment processors and the hardware associated thereto. Acquiring financial institutions 810 may be financial institutions, such as banks, or other entities that administers and manages payment accounts and/or payment instruments for use with payment accounts. In some instances, acquiring financial institutions 810 may manage transaction accounts for merchants 806. In some cases, a single financial institution may operate as both an issuing financial institution 802 and an acquiring financial institution 810.

The data signal transmitted from the merchant 806 to the gateway processor 808 may be superimposed with the transaction details for the payment transaction, which may be formatted based on one or more standards. In some embodiments, the standards may be set forth by the gateway processor 808, which may use a unique, proprietary format for the transmission of transaction data to/from the gateway processor 808. In other embodiments, a public standard may be used, such as the International Organization for Standardization's ISO 8883 standard. The standard may indicate the types of data that may be included, the formatting of the data, how the data is to be stored and transmitted, and other criteria for the transmission of the transaction data to the gateway processor 808.

In step 828, the gateway processor 808 may parse the transaction data signal to obtain the transaction data superimposed thereon and may format the transaction data as necessary. The formatting of the transaction data may be performed by the gateway processor 808 based on the proprietary standards of the gateway processor 808 or an acquiring financial institution 810 associated with the payment transaction. The proprietary standards may specify the type of data included in the transaction data and the format for storage and transmission of the data. The acquiring financial institution 810 may be identified by the gateway processor 808 using the transaction data, such as by parsing the transaction data (e.g., deconstructing into data elements) to obtain an account identifier included therein associated with the acquiring financial institution 810. In some instances, the gateway processor 808 may then format the transaction data based on the identified acquiring financial institution 810, such as to comply with standards of formatting specified by the acquiring financial institution 810. In some embodiments, the identified acquiring financial institution 810 may be associated with the merchant 806 involved in the payment transaction, and, in some cases, may manage a transaction account associated with the merchant 806.

In step 830, the gateway processor 808 may electronically transmit a data signal superimposed with the formatted transaction data to the identified acquiring financial institution 810. The acquiring financial institution 810 may receive the data signal and parse the signal to obtain the formatted transaction data superimposed thereon. In step 832, the acquiring financial institution may generate an authorization request for the payment transaction based on the formatted transaction data. The authorization request may be a specially formatted transaction message that is formatted pursuant to one or more standards, such as the ISO 8883 standard and standards set forth by a payment processor used to process the payment transaction, such as a payment network. The authorization request may be a transaction message that includes a message type indicator indicative of an authorization request, which may indicate that the merchant 806 involved in the payment transaction is requesting payment or a promise of payment from the issuing financial institution 802 for the transaction. The authorization request may include a plurality of data elements, each data element being configured to store data as set forth in the associated standards, such as for storing an account number, application cryptogram, transaction amount, issuing financial institution 802 information, etc.

In step 834, the acquiring financial institution 810 may electronically transmit the authorization request to a transaction processing server 812 for processing. The transaction processing server 812 may be comprised of one or more computing devices as part of a payment network configured to process payment transactions. In some embodiments, the authorization request may be transmitted by a transaction processor at the acquiring financial institution 810 or other entity associated with the acquiring financial institution. The transaction processor may be one or more computing devices that include a plurality of communication channels for communication with the transaction processing server 812 for the transmission of transaction messages and other data to and from the transaction processing server 812. In some embodiments, the payment network associated with the transaction processing server 812 may own or operate each transaction processor such that the payment network may maintain control over the communication of transaction messages to and from the transaction processing server 812 for network and informational security.

In step 836, the transaction processing server 812 may perform value-added services for the payment transaction. Value-added services may be services specified by the issuing financial institution 802 that may provide additional value to the issuing financial institution 802 or the consumer 804 in the processing of payment transactions. Value-added services may include, for example, fraud scoring, transaction or account controls, account number mapping, offer redemption, loyalty processing, etc. For instance, when the transaction processing server 812 receives the transaction, a fraud score for the transaction may be calculated based on the data included therein and one or more fraud scoring algorithms and/or engines. In some instances, the transaction processing server 812 may first identify the issuing financial institution 802 associated with the transaction, and then identify any services indicated by the issuing financial institution 802 to be performed. The issuing financial institution 802 may be identified, for example, by data included in a specific data element included in the authorization request, such as an issuer identification number. In another example, the issuing financial institution 802 may be identified by the primary account number stored in the authorization request, such as by using a portion of the primary account number (e.g., a bank identification number) for identification.

In step 838, the transaction processing server 812 may electronically transmit the authorization request to the issuing financial institution 802. In some instances, the authorization request may be modified, or additional data included in or transmitted accompanying the authorization request as a result of the performance of value-added services by the transaction processing server 812. In some embodiments, the authorization request may be transmitted to a transaction processor (e.g., owned or operated by the transaction processing server 812) situated at the issuing financial institution 802 or an entity associated thereof, which may forward the authorization request to the issuing financial institution 802.

In step 840, the issuing financial institution 802 may authorize the transaction account for payment of the payment transaction. The authorization may be based on an available credit amount for the transaction account and the transaction amount for the payment transaction, fraud scores provided by the transaction processing server 812, and other considerations that will be apparent to persons having skill in the relevant art. The issuing financial institution 802 may modify the authorization request to include a response code indicating approval (e.g., or denial if the transaction is to be denied) of the payment transaction. The issuing financial institution 802 may also modify a message type indicator for the transaction message to indicate that the transaction message is changed to be an authorization response. In step 842, the issuing financial institution 802 may transmit (e.g., via a transaction processor) the authorization response to the transaction processing server 812.

In step 844, the transaction processing server 812 may forward the authorization response to the acquiring financial institution 810 (e.g., via a transaction processor). In step 846, the acquiring financial institution may generate a response message indicating approval or denial of the payment transaction as indicated in the response code of the authorization response, and may transmit the response message to the gateway processor 808 using the standards and protocols set forth by the gateway processor 808. In step 848, the gateway processor 808 may forward the response message to the merchant 806 using the appropriate standards and protocols. In step 850, the merchant 806 may then provide the products purchased by the consumer 804 as part of the payment transaction to the consumer 804, assuming the payment transaction is approved.

In some embodiments, once the process 800 has completed, payment from the issuing financial institution 802 to the acquiring financial institution 810 may be performed. In some instances, the payment may be made immediately or within one business day. In other instances, the payment may be made after a period of time, and in response to the submission of a clearing request from the acquiring financial institution 810 to the issuing financial institution 802 via the transaction processing server 812. In such instances, clearing requests for multiple payment transactions may be aggregated into a single clearing request, which may be used by the transaction processing server 812 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 840), the transaction processing server 812 may be configured to perform authorization of transactions on behalf of the issuing financial institution 802. Such actions may be referred to as "stand-in processing," where the transaction processing server "stands in" as the issuing financial institution 802. In such instances, the transaction processing server 812 may utilize rules set forth by the issuing financial institution 802 to determine approval or denial of the payment transaction, and may modify the transaction message accordingly prior to forwarding to the acquiring financial institution 810 in step 844. The transaction processing server 812 may retain data associated with transactions for which the transaction processing server 812 stands in, and may transmit the retained data to the issuing financial institution 802 once communication is reestablished. The issuing financial institution 802 may then process transaction accounts accordingly to accommodate for the time of lost communication.

In another example, if the transaction processing server 812 is unavailable for submission of the authorization request by the acquiring financial institution 810, then the transaction processor at the acquiring financial institution 810 may be configured to perform the processing of the transaction processing server 812 and the issuing financial institution 802. The transaction processor may include rules and data suitable for use in making a determination of approval or denial of the payment transaction based on the data included therein. For instance, the issuing financial institution 802 and/or transaction processing server 812 may set limits on transaction type, transaction amount, etc. that may be stored in the transaction processor and used to determine approval or denial of a payment transaction based thereon. In such instances, the acquiring financial institution 810 may receive an authorization response for the payment transaction even if the transaction processing server 812 is unavailable, ensuring that transactions are processed and no downtime is experienced even in instances where communication is unavailable. In such cases, the transaction processor may store transaction details for the payment transactions, which may be transmitted to the transaction processing server 812 (e.g., and from there to the associated issuing financial institutions 802) once communication is reestablished.

In some embodiments, transaction processors may be configured to include a plurality of different communication channels, which may utilize multiple communication cards and/or devices, to communicate with the transaction processing server 812 for the sending and receiving of transaction messages. For example, a transaction processor may be comprised of multiple computing devices, each having multiple communication ports that are connected to the transaction processing server 812. In such embodiments, the transaction processor may cycle through the communication channels when transmitting transaction messages to the transaction processing server 812, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 810 may identify that an authorization request involves an issuing financial institution 802 (e.g., via the bank identification number included in the transaction message) for which no value-added services are required. The transaction processor at the acquiring financial institution 810 may then transmit the authorization request directly to the transaction processor at the issuing financial institution 802 (e.g., without the authorization request passing through the transaction processing server 812), where the issuing financial institution 802 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 812 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 808, acquiring financial institution 810, etc.) for processing using this advanced network, and to quickly and efficiently receive a response regarding the ability for a consumer 804 to fund the payment transaction.

Computer System Architecture

Figure 9:
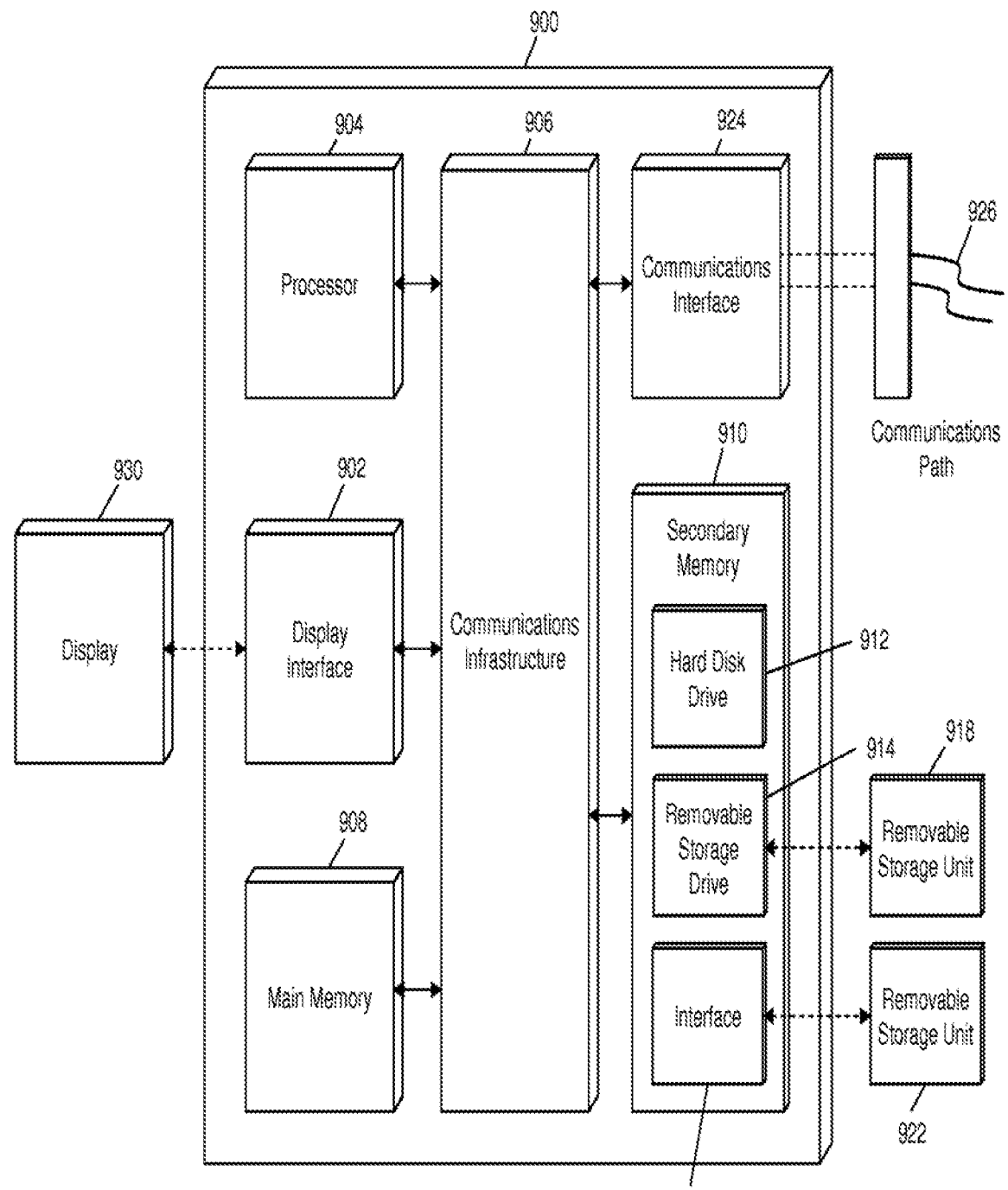
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the merchant server 102 and validation server 104 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 5A, 5B, and 6-8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 4, 5A, 5B, and 6-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for enhanced validation of an entity associated with a merchant-specific token. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A solid rocket motor comprising:
a fuel;
a binder;
a perchlorate oxidizer that is thermally decomposable to perchlorate decomposition products; and
a salt compound that is reactive with one or more of the perchlorate decomposition products, wherein the salt compound is selected from the group consisting of sulfite, phosphite, borate, borite, perborate, and combinations thereof, and wherein there is a total combined weight of the fuel, the binder, the perchlorate oxidizer, and the salt compound, and the salt compound is 1% to 10% of the total combined weight.

2. The solid rocket motor as recited in claim 1, wherein the metal of the metal salt is thermodynamically favored to react spontaneously with one or more of the perchlorate decomposition products.

3. The solid rocket motor as recited in claim 1, wherein the salt compound is 1% to 5% of the total combined weight.

4. The solid rocket motor as recited in claim 1, wherein the binder is hydroxyl-terminated polybutadiene, the perchlorate oxidizer includes at least one of ammonium perchlorate, sodium perchlorate, or potassium perchlorate, and the fuel includes at least one of aluminum, magnesium, or boron-based salts.

5. A solid rocket motor comprising:
a fuel;
a binder;
a perchlorate oxidizer that is thermally decomposable to perchlorate decomposition products; and
an additive that is thermodynamically favored to react spontaneously with one or more of the perchlorate decomposition products, wherein the additive is a salt compound selected from the group consisting of borate, borite, perborate, and combinations thereof, there is a total combined weight of the fuel, the binder, the perchlorate oxidizer, and the salt compound, and the salt compound is 1% to 10% of the total combined weight.

6. The solid rocket motor as recited in claim 5, wherein there is a total combined weight of the fuel, the binder, the perchlorate oxidizer, and the salt compound, and the salt compound is 0.1% to 20% of the total combined weight.

7. A method for testing stability of a solid rocket motor, the method comprising:
gradually increasing an environment temperature around a solid rocket motor, wherein the solid rocket motor includes a fuel, a binder, a perchlorate oxidizer that is thermally decomposable to perchlorate decomposition products, and a salt compound that is reactive with one or more of the perchlorate decomposition products, wherein the salt compound is selected from the group consisting of sulfite, phosphite, borate, borite, perborate, and combinations thereof, there is a total combined weight of the fuel, the binder, the perchlorate oxidizer, and the salt compound, and the salt compound is 1% to 10% of the total combined weight; and
measuring at least one of i) the environment temperature at which the solid rocket motor burns, explodes, or detonates or ii) a time period at which the solid rocket motor burns, explodes, or detonates from the gradual increasing of the environment temperature.

8. The method as recited in claim 7, wherein the binder is hydroxyl-terminated polybutadiene, the perchlorate oxidizer includes at least one of ammonium perchlorate, sodium perchlorate, or potassium perchlorate, and the fuel includes at least one of aluminum, magnesium, or boron-based salt.

9. The solid rocket motor as recited in claim 1, wherein the salt is sulfite.

10. The solid rocket motor as recited in claim 1, wherein the salt is phosphite.

11. The solid rocket motor as recited in claim 1, wherein the salt is selected from the group consisting of borate, borite, perborate, and combinations thereof.

* * * * *